United States Patent
Tokutake

(10) Patent No.: US 9,507,401 B2
(45) Date of Patent: *Nov. 29, 2016

(54) MOBILE TERMINAL DEVICE, OPERATION METHOD, PROGRAM, AND STORAGE MEDIUM

(71) Applicants: SONY MOBILE COMMUNICATIONS INC., Tokyo (JP); SONY CORPORATION, Tokyo (JP)

(72) Inventor: Kenji Tokutake, Kanagawa (JP)

(73) Assignees: SONY CORPORATION, Tokyo (JP); SONY MOBILE COMMUNICATIONS INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/800,229

(22) Filed: Jul. 15, 2015

(65) Prior Publication Data
US 2016/0011643 A1   Jan. 14, 2016

Related U.S. Application Data

(63) Continuation of application No. 13/926,744, filed on Jun. 25, 2013, now Pat. No. 9,116,696.

(60) Provisional application No. 61/672,953, filed on Jul. 18, 2012.

(51) Int. Cl.
| | |
|---|---|
| G06F 3/045 | (2006.01) |
| G06F 1/32 | (2006.01) |
| G06F 3/01 | (2006.01) |
| G06F 3/042 | (2006.01) |
| G06F 3/0488 | (2013.01) |
| G06F 3/041 | (2006.01) |

(52) U.S. Cl.
CPC ........... *G06F 1/3218* (2013.01); *G06F 1/3262* (2013.01); *G06F 3/017* (2013.01); *G06F 3/041* (2013.01); *G06F 3/0421* (2013.01); *G06F 3/0488* (2013.01); *G06F 3/04883* (2013.01)

(58) Field of Classification Search
CPC .... G06F 1/3218; G06F 1/3262; G06F 3/017; G06F 3/041; G06F 3/042; G06F 3/0421; G06F 3/044; G06F 3/0488
USPC ................... 345/173–179; 178/18.01–18.09, 178/20.01–20.04
See application file for complete search history.

(56) References Cited

U.S. PATENT DOCUMENTS

| | | |
|---|---|---|
| 6,639,584 B1 | 10/2003 | Li |
| 7,911,456 B2 | 3/2011 | Gillespie et al. |
| 8,046,721 B2 | 10/2011 | Chaudhri et al. |

(Continued)

*Primary Examiner* — Vijay Shankar
(74) *Attorney, Agent, or Firm* — Oblon, McClelland, Maier & Neustadt, L.L.P.

(57) ABSTRACT

A mobile terminal device includes a touch panel where a specified input operation is performed with an indicator, an input detection unit, and an operation determination unit. The input detection unit detects the pattern of the input operation based on the position of the indicator on the touch panel, and decreases the frequency of execution of processing arranged to detect the input operation performed on the touch panel when an input operation performed on the touch panel is not detected over a specified time period. When the pattern of the input operation is detected in the case where the execution frequency of the processing arranged to detect the input operation is low, the operation determination unit causes a controlled unit determined to be an operation target in relation to the pattern of the input operation to execute a specified operation.

24 Claims, 28 Drawing Sheets

(56) References Cited

U.S. PATENT DOCUMENTS

| | | |
|---|---|---|
| 8,681,098 B2 | 3/2014 | Underkoffler et al. |
| 8,723,793 B2 | 5/2014 | Smith et al. |
| 9,116,696 B2 * | 8/2015 | Tokutake .............. G06F 1/3262 |
| 2008/0048997 A1 | 2/2008 | Gillespie et al. |

* cited by examiner

USUAL SCAN (60 Hz)

INTERMITTENT SCAN (10 Hz)

|   | 1 | 2 | 3 | 4 | 5 | 6 | 7 | 8 | 9 | 10 | (X) |
|---|---|---|---|---|---|---|---|---|---|---|---|
| 1 | 10 | 8 | 8 | 10 | 7 | 8 | 7 | 9 | 10 | 8 | |
| 2 | 8 | 7 | 9 | 7 | 8 | 7 | 8 | 7 | 8 | 8 | |
| 3 | 8 | 8 | 10 | 7 | 6 | 7 | 9 | 10 | 8 | 9 | |
| 4 | 7 | 8 | 7 | 8 | 7 | 8 | 8 | 10 | 7 | 9 | |
| 5 | 7 | 8 | 7 | 10 | 8 | 7 | 9 | 10 | 8 | |
| 6 | 10 | 7 | 8 | 8 | 10 | 7 | 8 | 7 | 9 | 10 | |
| 7 | 7 | 9 | 10 | 10 | 7 | 8 | 8 | 8 | 10 | 7 | |
| 8 | 7 | 9 | 8 | 10 | 7 | 8 | 7 | 9 | 10 | 8 | |
| 9 | 8 | 8 | 8 | 7 | 9 | 10 | 8 | 8 | 10 | 7 | |
| 10 | 9 | 10 | 10 | 8 | 8 | 7 | 9 | 10 | 8 | 10 | |
| 11 | 8 | 7 | 9 | 9 | 10 | 10 | 8 | 8 | 10 | 7 | |
| 12 | 8 | 10 | 7 | 9 | 9 | 8 | 10 | 7 | 9 | 10 | |
| 13 | 8 | 7 | 90 | 10 | 8 | 8 | 7 | 9 | 10 | 8 | |
| 14 | 7 | 90 | 100 | 90 | 8 | 8 | 10 | 7 | 9 | 9 | |
| 15 | 8 | 8 | 90 | 8 | 7 | 8 | 7 | 9 | 10 | 8 | |
| 16 | 9 | 10 | 9 | 10 | 8 | 7 | 9 | 10 | 8 | 10 | |
| 17 | 8 | 7 | 9 | 10 | 8 | 8 | 7 | 9 | 10 | 8 | |
| 18 | 8 | 10 | 7 | 9 | 9 | 7 | 8 | 7 | 9 | 10 | |
| 19 | 8 | 7 | 9 | 10 | 8 | 7 | 10 | 8 | 8 | 10 | |
| 20 | 8 | 8 | 10 | 7 | 8 | 7 | 9 | 10 | 8 | 9 | |

(Y)

|   | 1 | 2 | 3 | 4 | 5 | 6 | 7 | 8 | 9 | 10 | (X) |
|---|---|---|---|---|---|---|---|---|---|----|-----|
| 1 | 70 | 70 | 65 | 80 | 80 | 70 | 70 | 65 | 80 | 80 | |
| 2 | 55 | 55 | 80 | 55 | 80 | 55 | 55 | 80 | 55 | 80 | |
| 3 | 55 | 55 | 75 | 80 | 80 | 55 | 55 | 75 | 80 | 80 | |
| 4 | 65 | 55 | 80 | 40 | 80 | 65 | 55 | 80 | 40 | 80 | |
| 5 | 55 | 55 | 75 | 80 | 80 | 70 | 65 | 80 | 80 | 65 | |
| 6 | 80 | 55 | 80 | 40 | 80 | 55 | 80 | 55 | 80 | 80 | |
| 7 | 80 | 80 | 80 | 80 | 80 | 55 | 75 | 80 | 80 | 50 | |
| 8 | 30 | 70 | 65 | 80 | 80 | 55 | 80 | 40 | 80 | 45 | |
| 9 | 80 | 55 | 80 | 55 | 45 | 70 | 70 | 65 | 80 | 80 | |
| 10 | 80 | 55 | 75 | 80 | 80 | 55 | 55 | 80 | 55 | 30 | |
| 11 | 80 | 55 | 80 | 40 | 80 | 55 | 55 | 75 | 80 | 80 | |
| 12 | 45 | 55 | 80 | 55 | 70 | 65 | 55 | 80 | 40 | 80 | |
| 13 | 80 | 55 | 75 | 80 | 55 | 80 | 55 | 80 | 80 | 80 | |
| 14 | 80 | 55 | 80 | 40 | 55 | 75 | 80 | 80 | 80 | 80 | |
| 15 | 70 | 65 | 80 | 80 | 55 | 80 | 40 | 80 | 80 | 55 | |
| 16 | 55 | 80 | 55 | 80 | 70 | 65 | 80 | 80 | 80 | 40 | |
| 17 | 55 | 75 | 80 | 80 | 55 | 80 | 55 | 80 | 80 | 40 | |
| 18 | 55 | 80 | 40 | 80 | 55 | 75 | 80 | 80 | 80 | 30 | |
| 19 | 80 | 80 | 65 | 80 | 55 | 80 | 40 | 80 | 80 | 80 | |
| 20 | 80 | 80 | 80 | 80 | 65 | 80 | 80 | 80 | 80 | 80 | |
| (Y) | | | | | | | | | | | |

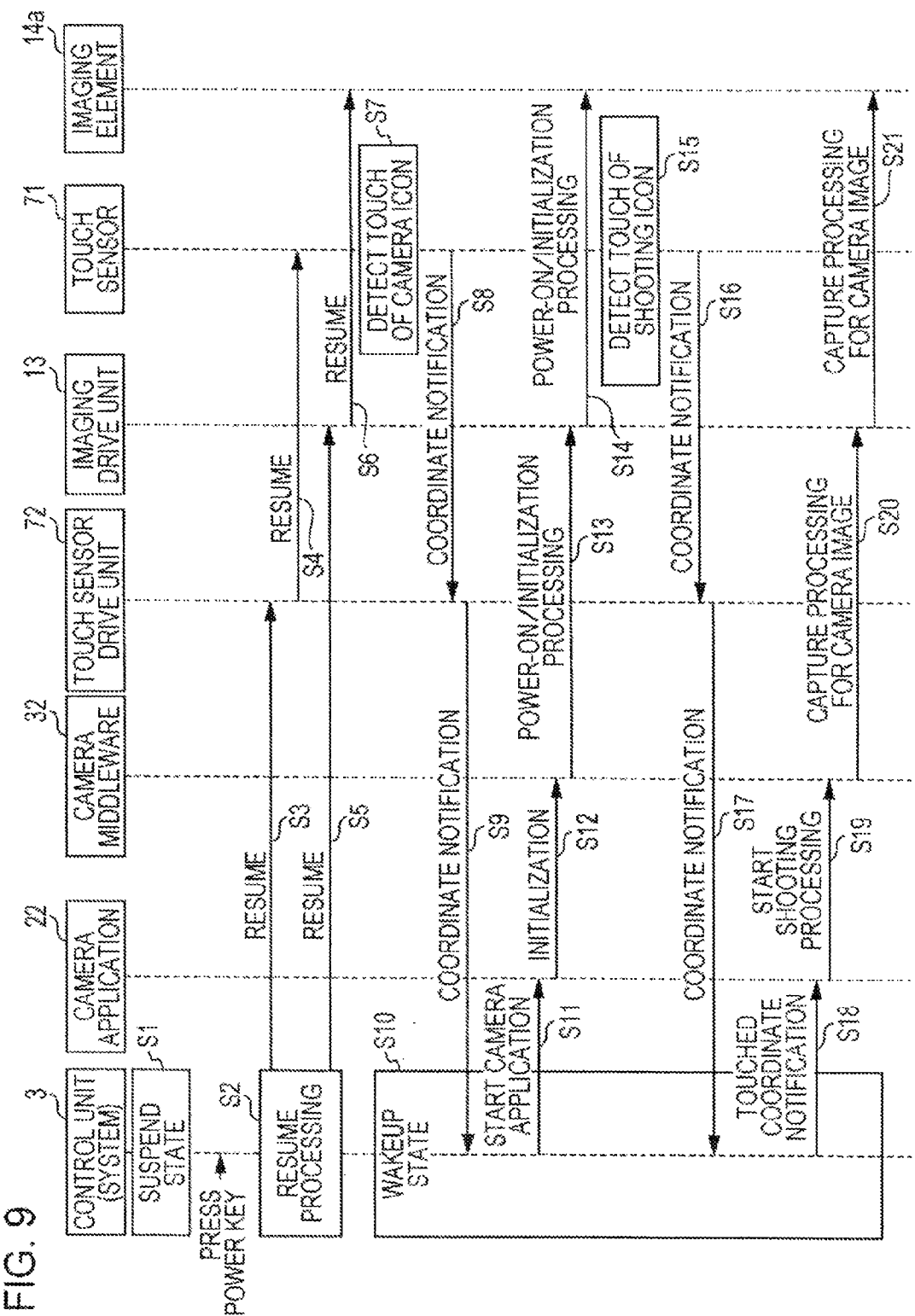

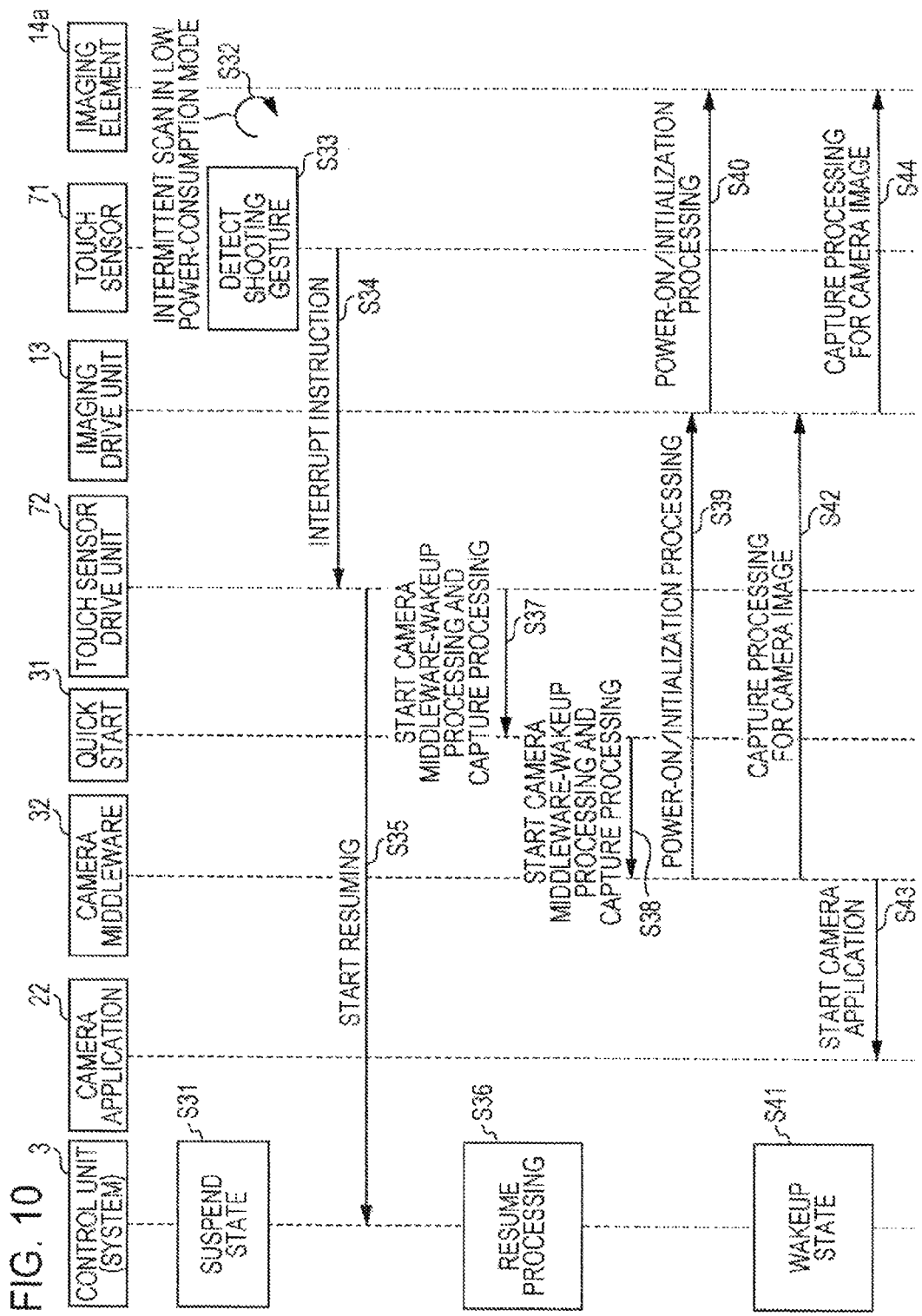

WEB BROWSER

GALLERY APPLICATION

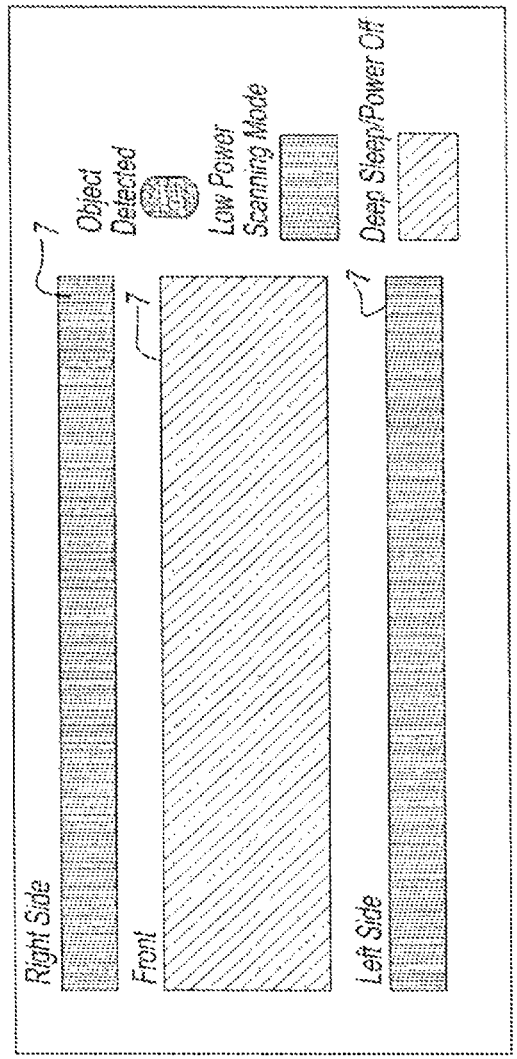
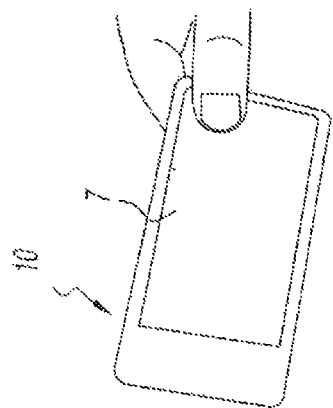
FIG. 23B
FIG. 23A

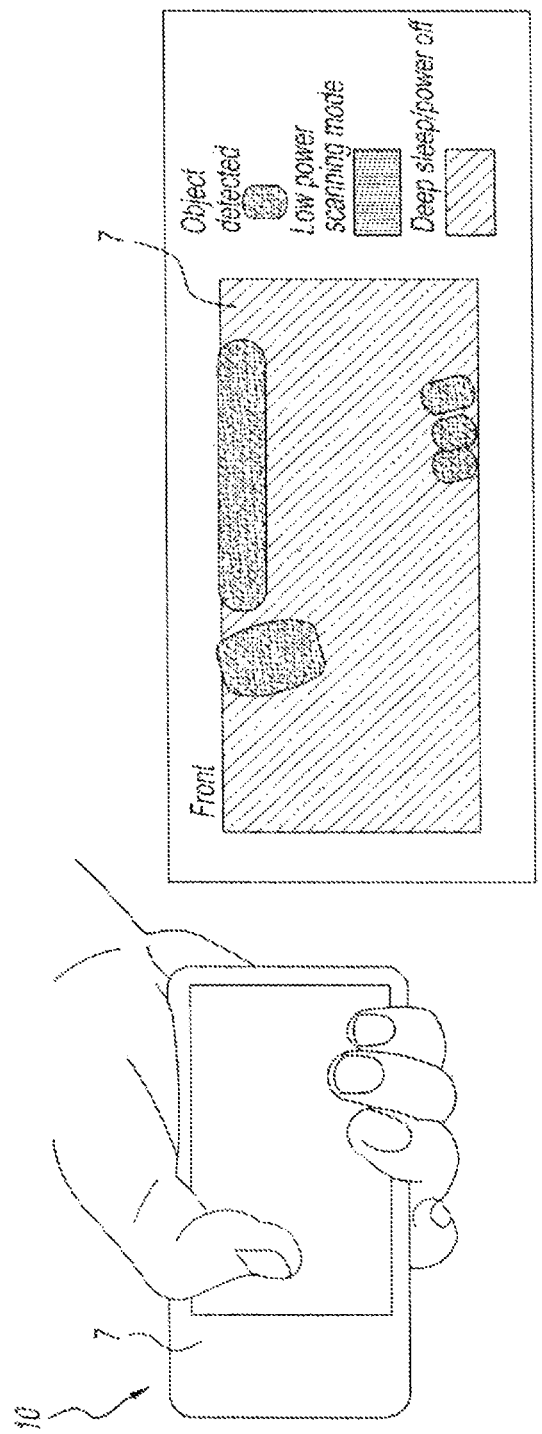

MOBILE TERMINAL DEVICE, OPERATION METHOD, PROGRAM, AND STORAGE MEDIUM

CROSS REFERENCE TO RELATED APPLICATION

This application is a continuation of U.S. patent application Ser. No. 13/926,744, filed Jun. 25, 2013, now U.S. Pat. No. 9,116,696, issued Aug. 25, 2015, which is based upon and claims the benefit of the earlier filing date of U.S. Provisional Patent Application No. 61/672,953 filed in the USPTO on Jul. 18, 2012, the entire contents of which being incorporated herein by reference in its entirety.

TECHNICAL FIELD

The present disclosure relates to a mobile terminal device, an operation method, a program, and a storage medium that are applied to the case where a user performs an input operation for a touch panel to execute a specific function.

BACKGROUND ART

In recent years, touch panels have been increasingly adopted for terminal devices including a mobile phone terminal, a high performance-type mobile information terminal having a conversation function, what is referred to as a smart phone, a tablet-type terminal, and so forth, as input devices for which users perform an operation input. The touch panel is a device including a display unit displaying an image, etc. and a position input device such as a touch sensor, which are integrated into one body.

In a terminal device including a touch panel, specified operations are input by a user to various icons that are displayed on the screen of the display unit, for example, so that application software (hereinafter often abbreviated to "application") executes. The application is associated with the icon, and performs an operation in accordance with the details of the operation input. As operation input methods, a tap operation achieved by tapping the screen, a drag operation achieved by moving an indicator including a touched finger, a stylus pen, etc. from a specified position to a different position, a flick operation achieved by moving the finger or the indicator on the screen in such a way to make a quick sweeping stroke, a tap operation achieved by tapping the screen, and so forth have been available.

The various operations are determined based on, for example, information about a coordinate position defined on the screen where a finger of the user or the indicator touches or approaches, which is attained during a series of operations performed from when the finger or the indicator touches the screen to when the finger or the indicator leaves the screen. Specifically, information about, for example, the amount of a change in the coordinate position per unit time, the moving speed of the coordinate position, an area on the screen where a touch is detected, etc. is used as information specifying the details of an operation input.

Then, in the mobile terminal device, a shift to a suspend state which is a power saving mode is made when there is no operation input from the user over a fixed time period, so as to reduce the power consumption. In the suspend state, the light amount of backlight of the display unit is reduced, or various functions are stopped to reduce the power consumption. However, since the details of an operation input performed before making the shift to the suspend state, etc. are stored in a memory, processing can be started again by reading the details of the operation input, etc. from the memory after waking up from the suspend state (referred to as "wakeup"). In the following description, processing performed to wake up from the suspend state is referred to as "resuming".

FIGS. 17A and 17B are schematic diagrams illustrating an exemplary external configuration of a known mobile terminal device 100. FIG. 17A illustrates an exemplary operation performed to wake up the mobile terminal device 100 from the suspend state, and FIG. 17B illustrates an example where an application is started through resuming and icons, etc. are displayed on a display unit 102.

The mobile terminal device 100 includes a touch panel 101, the display unit 102 superimposed on the touch panel 101, and a home button 103 provided to display a home screen image. When the mobile terminal device 100 is in the suspend state, a user performs an operation by pressing the home button 103 with a finger (see FIG. 17A). When the mobile terminal device 100 wakes up through resuming, the home screen image is displayed on the display unit 102 (see FIG. 17B). On the home screen image, lists of various types of video, functional icons are displayed.

Further, the method of starting the operation of a device by detecting an operation performed on the touch panel has also become available. For example, in Patent Literature 1, the method of shifting a device to a user-interface unlocked state when a contact with a touch sensitive display corresponds to a specified gesture is disclosed.

CITATION LIST

Patent Literature

[PTL 1] Description of U.S. Pat. No. 8,046,721

SUMMARY OF INVENTION

As stated above, in the known mobile terminal device 100, each unit is resumed after the user presses the home button 103, or after a specified gesture operation is input by the user. Then, an operation including selecting the functional icon corresponding to an application to be started anew after the home screen image is displayed and starting the application is performed. However, it is much trouble to perform the operation including selecting the functional icon after going through the home screen image each time resuming is performed, which makes it impossible to use a target function immediately. Further, when resuming is performed, initialization processing, etc. are needed for each target function, which becomes a cause of retarding the startup of an application.

Accordingly, the inventor recognizes the necessity to immediately execute a specific function when in the suspend state.

A mobile terminal device according to an embodiment of the present disclosure includes a touch panel where a specified input operation is performed with an indicator, an input detection unit configured to detect a pattern of the input operation based on a position of the indicator on the touch panel, and decrease a frequency of execution of processing arranged to detect the input operation performed on the touch panel when the input operation performed on the touch panel is not detected over a specified time period, and an operation determination unit configured to instruct a controlled unit determined to be an operation target based on the pattern of the input operation to execute a specified operation when the pattern of the input operation is detected in the case where the execution frequency of the processing arranged to detect the input operation is low.

Further, an operation method according to an embodiment of the present disclosure includes a step of detecting a pattern of an input operation based on a position of an indicator by which an input operation is performed on a touch panel, a step of detecting the pattern of the input operation based on the position of the indicator on the touch panel, and decreasing a frequency of execution of processing arranged to detect the input operation performed on the touch panel when the input operation performed on the touch panel is not detected over a specified time period, and a step of instructing a controlled unit determined to be an operation target based on the pattern of the input operation to execute a specified operation when the pattern of the input operation is detected in the case where the execution frequency of the processing arranged to detect the input operation is low.

Further, a program according to an embodiment of the present disclosure causes a computer to execute a procedure for detecting a pattern of an input operation based on a position of an indicator by which an input operation is performed on a touch panel, a procedure for detecting the pattern of the input operation based on the position of the indicator on the touch panel, and decreasing a frequency of execution of processing arranged to detect the input operation performed on the touch panel when the input operation performed on the touch panel is not detected over a specified time period, and a procedure for instructing a controlled unit determined to be an operation target based on the pattern of the input operation to execute a specified operation when the pattern of the input operation is detected in the case where the execution frequency of the processing arranged to detect the input operation is low.

Further, a computer-readable storage medium according to an embodiment of the present disclosure stores a program causing a computer to execute a procedure for detecting a pattern of an input operation based on a position of an indicator by which an input operation is performed on a touch panel, a procedure for detecting the pattern of the input operation based on the position of the indicator on the touch panel, and decreasing a frequency of execution of processing arranged to detect the input operation performed on the touch panel when the input operation performed on the touch panel is not detected over a specified time period, and a procedure for instructing a controlled unit determined to be an operation target based on the pattern of the input operation to execute a specified operation when the pattern of the input operation is detected in the case where the execution frequency of the processing arranged to detect the input operation is low.

According to the present disclosure, when an input operation performed on the touch panel is not detected over a specified time period, the power consumption is reduced by decreasing the execution frequency of processing arranged to detect the input operation performed on the touch panel. Then, when the pattern of the input operation is detected when the execution frequency of the processing is decreased, a controlled unit determined to be an operation target in relation to the pattern of the input operation is caused to execute a specified operation. Accordingly, a specific function can be immediately executed when no input operation is performed and a shift to the suspend state is made.

BRIEF DESCRIPTION OF DRAWINGS

FIG. 9 is a sequence diagram illustrating exemplary processing executed to start a camera application and perform shooting through a known operation.

FIG. 10 is a sequence diagram illustrating exemplary processing executed to start the camera application and perform shooting through an operation performed according to the first embodiment of the present disclosure.

FIGS. 23A and 23B are explanatory diagrams illustrating an example where a mobile terminal device is held by one hand avoiding touching side panels and exemplary object detected area of side panels according to the fifth embodiment of the present disclosure.

FIGS. 24A and 24B are explanatory diagrams illustrating an example where a mobile terminal device is held by one hand and exemplary object detected area of a front panel according to the fifth embodiment of the present disclosure.

DESCRIPTION OF EMBODIMENTS

Figure 1:
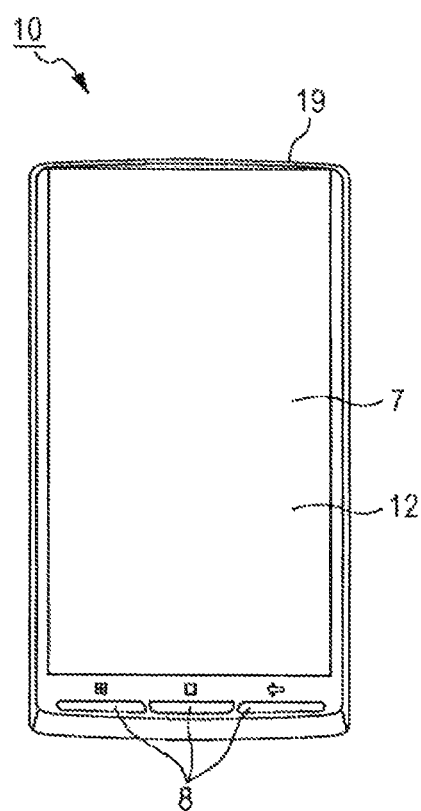
FIG. 1 is a schematic diagram illustrating an exemplary external configuration of a mobile terminal device according to a first embodiment of the present disclosure.

Hereinafter, embodiments of the present disclosure will be described. Incidentally, the descriptions will be given in the following order.
<First Embodiment>
1. Exemplary External configuration of Mobile terminal device
2. Exemplary Internal configuration of Mobile terminal device
3. Exemplary Software configuration
4. Exemplary Scans performed for Touch sensor
5. Exemplary Gesture operations
  5-1. Exemplary Gesture operations performed to start Home screen image
  5-2. Exemplary Gesture operation performed to execute Shooting
  5-3. Exemplary Gesture operation executed to perform Music reproduction
<Second Embodiment>
6. Example where Operation is performed in concert with Another device
<Third Embodiment>
7. Example where Application is started through Two-step gesture operation
<Fourth Embodiment>
8. Exemplary Assistance function started when Gesture operation ends in failure Hereinafter, a first embodiment of the present disclosure will be described with reference to FIG. 1 to FIG. 12. In the present embodiment, an exemplary application of a mobile terminal device 10 configured to immediately start a specific function in response to an operation performed for a touch panel 7 will be described. The mobile terminal device 10 achieves an operation method performed by internal blocks working in cooperation with one another, which will be described later, through a computer executing a program. Incidentally, common components that are shown in the drawings are designated by the same reference signs.

First Embodiment

1. Exemplary External Configuration of Mobile Terminal Device

FIG. 1 is a schematic diagram illustrating an exemplary external configuration of the mobile terminal device 10.

The mobile terminal device 10 includes a cabinet 19, a touch panel 7 where a specified input operation is performed with an indicator, the touch panel 7 being accommodated in the front part of the cabinet 19, and operation keys 8 that are provided on, for example, the end part of the front of the cabinet 19.

The touch panel 7 is employed as an input device for which a user performs an input operation for a terminal device including a mobile phone terminal, a high performance-type mobile information terminal having a conversation function, what is referred to as a smart phone, a tablet-type terminal, and so forth. The touch panel 7 is configured as, for example, a sensor achieved under the capacitance system. Then, the touch panel 7 includes a touch sensor 7 (see FIG. 2) used as a position input device to which a position specified by an indicator including a finger, a stylus pen, etc. is input and a display unit 12 displaying an image, etc., which are integrated into one body. The display unit 12 includes, for example, a liquid crystal panel or an organic EL (Electro Luminescence) panel, etc.

As a sensing system allowing the touch panel 7 to detect an input operation achieved by the indicator, the following systems may be used. For example, the resistive film system detecting a change in the resistance value of a part touched by the indicator, the electromagnetic induction system detecting the electromagnetic energy of an indicator specifically designed to generate a magnetic field, the capacitance system detecting a change in the capacitance value of a touched part, etc. may be used.

Hereinafter, an example where a finger is used as the indicator performing an input operation on the touch panel 7 will be described.

As for the terminal device 10, the user inputs specified operations for various icons that are displayed on the screen of the display unit 12, for example, so that various applications that are associated with the icons perform operations based on the details of the operation inputs. The details of the input operations include a tap operation achieved by tapping the surface of the touch panel 7, a drag operation achieved by moving a finger caused to touch the touch panel 7 from a specified position to a different position, a flick operation achieved by moving the finger on the screen in such a way to make a quick sweeping stroke, and so forth.

The various operations are determined based on, for example, information about coordinates on the screen where a finger touches or approaches during a series of operations performed from when the a finger of the user or a finger touches the screen to when the finger of the user or the finger leaves the screen. Specifically, information about, for example, the amount of a change in the coordinates per unit time, the moving speed of the coordinates, an area on the screen where a touch is detected, etc. is used as information specifying the details of an operation input.

The operation keys 8 include a home button, a power button, a volume button, etc. The user can display a home screen image on the display unit 12 by pressing the home button. Further, the power of the mobile terminal device 10 can be turned on/off by pressing the power button. Further, the magnitude of volume can be changed during a conversation or during the music reproduction by pressing the volume button.

2. Exemplary Internal Configuration of Mobile Terminal Device

Figure 2:
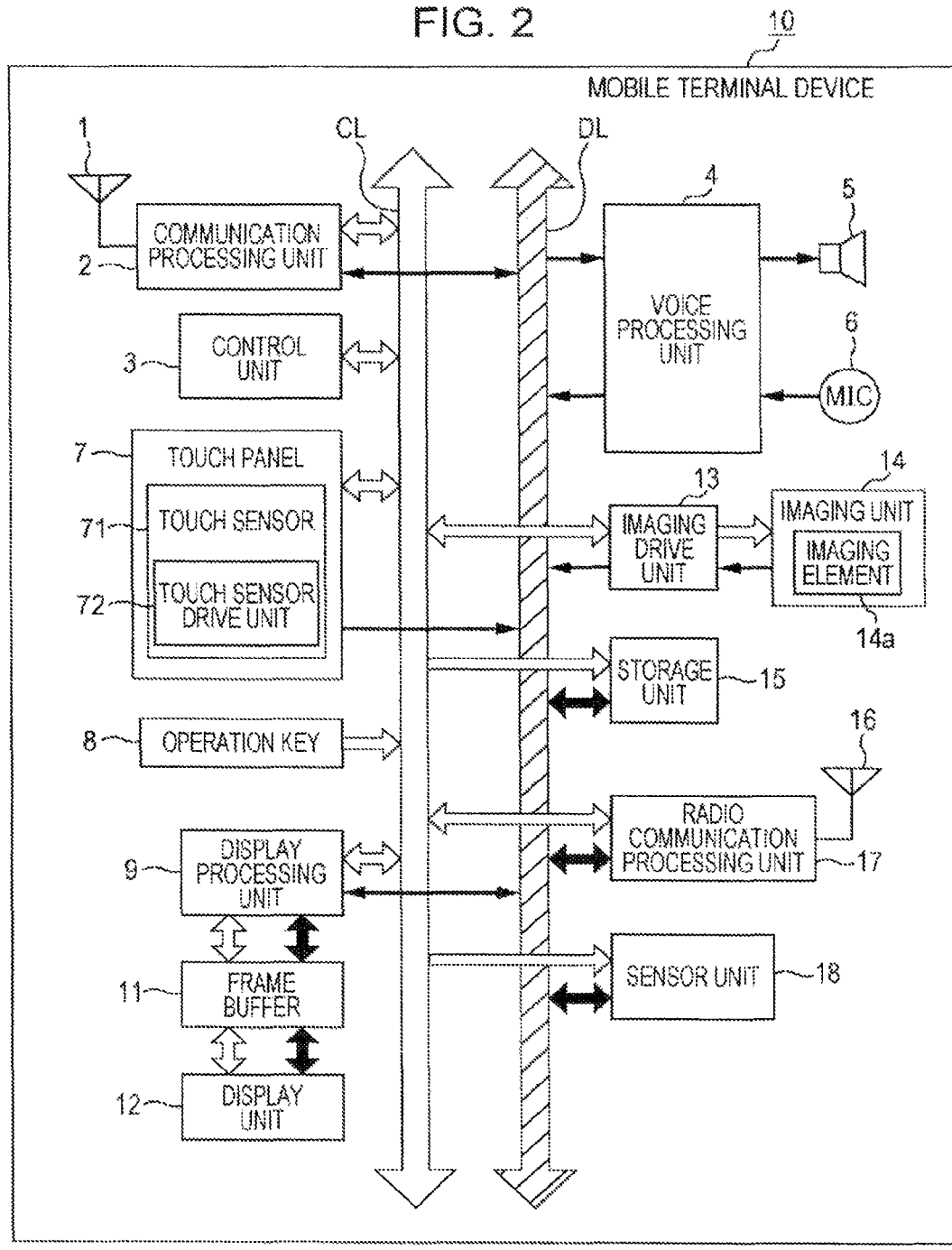
FIG. 2 is a block diagram illustrating an exemplary internal configuration of the mobile terminal device according to the first embodiment of the present disclosure.

FIG. 2 is a block diagram illustrating an exemplary internal configuration of the mobile terminal device 10.

The mobile terminal device 10 includes an antenna 1 performing transmission and reception of an electric wave between a radio telephone base station, a communication processing unit 2 to which the antenna 1 is connected, and a control unit 3. Further, the mobile terminal device 10 includes a voice processing unit 4, a speaker 5, and a microphone 6.

The communication processing unit 2 performs radio communications with the radio telephone base station under control of the control unit 3. During a voice conversation, voice data included in data received with the communication processing unit 2 is supplied to the voice processing unit 4 that performs voice processing for the voice data and that causes the speaker 5 to emit a voice. Then, the voice processing unit 4 performs decoding processing for the voice data so that an analog voice signal is obtained. The analog voice signal obtained with the voice processing unit 4 is supplied to the speaker 5, which is an exemplary sound emitting unit, and output as a voice. A voice signal collected and acquired with the microphone 6 is also supplied to the voice processing unit 4, and encoded into voice data in a specified encoding format (e.g., PWM (Pulse Width Modulation)) with the voice processing unit 4. Then, the acquired voice data is supplied to the communication processing unit 2, and emitted through the antenna 1 as a radio wave.

The processing units including the communication processing unit 2, the voice processing unit 4, and so forth exchange control data with the control unit 3 via a control line CL, and transfer data via a data line DL. The control unit 3 includes a CPU (Central Processing Unit), a GPU (Graphics Processing Unit), and so forth, and controls the units constituting the mobile terminal device 10. For example, the control unit 3 performs changing a command issued for application software stored in a storage unit 3 that will be described later, etc. based on a result of the operation determination performed with a touch sensor drive unit 72 that will be described later.

Further, the mobile terminal device 10 includes the touch panel 7 and the operation keys 8. In the touch panel 7, the touch sensor 71, the touch sensor drive unit 72, and the display unit 12 are included. The touch sensor 71 is configured as, for example, a sensor achieved under the mutual capacitance system of the projected capacitance system, and includes transmission electrodes (TX) and reception electrodes (RX) that are not shown, which are arranged in matrix form in the X direction and the Y direction.

By grounding the reception electrode and inputting a drive pulse to the transmission electrode, an electric field is generated between the transmission electrode and the reception electrode. When an indicator including a finger of the user, which is a kind of electric conductor, a stylus pen, etc., approaches the surface of the touch panel 7 (hereinafter referred to as the "operation surface"), part of the electric field is absorbed in the electric conductor so that the electric field generated between the transmission electrode and the reception electrode is decreased. Consequently, an electric charge (capacitance value) occurring in the reception electrode is also decreased. Accordingly, the measurement of a decrease in the electric charge, the decrease being associated with a decrease in the electric field generated between the transmission electrode and the reception electrode, allows for detecting that the operation surface of the touch panel 7 is touched/untouched.

The touch sensor drive unit 72 inputs a drive pulse to each transmission electrode, and detects an electric charge of the reception electrode. The touch sensor 71 is used as an input detection unit that detects whether the indicator for which an input operation is performed touches or untouches the operation surface of the touch panel 7 by measuring a change in the capacitance value detected with the touch sensor drive unit 72.

The touch sensor 71 detects a position defined on the operation surface of the touch panel 7 where a touch or an approach of the indicator is detected, and detects the position of the indicator on the touch panel 7. Then, the touch sensor 71 also outputs information about the XY coordinates corresponding to that position. As for the details of an input operation performed by the user, a pinch (pinch-in/pinch-out) operation achieved by decreasing and increasing the space between two fingers, etc. are performed in addition to the above-described tap operation, drag operation, and flick operation. Further, the touch sensor 71 detects the pattern of an input operation performed by the indicator on the touch panel 7 based on a position (coordinate information, etc.) defined on the screen where the indicator touches or approaches during a series of operations performed from when the indicator touches on the operation surface to when the indicator leaves the operation surface.

The touch sensor drive unit 72 is used as an operation determination unit that determines the type of the indicator (whether or not it is a finger, etc.) that touches or approaches the operation surface of the touch panel 7 based on a capacitance value detected with the touch sensor 71. The capacitance value includes, for example, information about a distribution attained on the operation surface of the touch panel 7, the magnitude of the capacitance value, and so forth.

The control unit 3 controls the display processing unit 9 to perform control to cause the display unit 12 to display a specified screen image.

The display processing unit 9 causes the display unit 12 to display the screen image corresponding to an application executed with the control unit 3. For example, the display unit 12 is caused to display video taken by a camera application. Further, a browser or the like is often scrolled up or down for display based on the details of an operation performed on the operation surface of the touch panel 7, the screen image is often moved based on the flick operation, and a selected spot is often reduced or enlarged for display based on the pinch operation. For displaying an image on the display unit 12, the display processing unit 9 stores several frames' worth of video data in a frame buffer 11. The frame buffer 11 is a memory storing video data on FIFO (First In, First Out) basis. The display unit 12 displays video based on the video data of each frame read from the frame buffer 11.

Further, the mobile terminal device 10 includes an imaging drive unit 13, an imaging unit 14, a storage unit 15, an antenna 16, a radio communication processing unit 17, and a sensor unit 18.

The imaging unit 14 includes an imaging element 14a that has an image sensor including, for example, a CCD (Charge Coupled Device), a CMOS (Complementary Metal Oxide Semiconductor), and so forth. Further, the imaging unit 14 has an optical system including an un-illustrated lens provided to photograph a subject, a shutter, and so forth. Then, the imaging unit 14 generates an image signal by performing photoelectric conversion for a subject light formed on the light receiving surface thereof via the un-illustrated lens. An imaging operation of the imaging unit 14 is controlled with the imaging drive unit 13.

The voice processing unit 4 and the speaker 5, the display processing unit 9, the frame buffer 11 and the display unit 12, and the imaging drive unit 13 and the imaging unit 14 are used as controlled units. The operations of the controlled units are controlled via middleware when an input operation is performed on the touch panel 7 in the state where application software is started, and the operations are controlled via the middleware in a suspend state.

Then, when the pattern of the input operation is detected when the frequency of execution of processing arranged to detect an input operation is low, the touch sensor drive unit 72 instructs a controlled unit which is determined to be an operation target based on the pattern of the input operation to execute a specified operation. Further, when the pattern of the input operation is detected in the suspend state where at least the application software and the middleware are not started, the touch sensor drive unit 72 starts the middleware that will be described later. Then, a specified operation is executed from the middleware to the controlled unit which is determined to be the operation target in relation to the pattern of the input operation.

The storage unit 15 includes a ROM (Read Only Memory) or a RAM (Random Access Memory), and stores various types of application software, necessary data for executing those, and so forth. The radio communication processing unit 17 communicates with peripheral devices by radio based on procedures conforming to a specified communication standard via the connected antenna 16.

The sensor unit 18 includes an acceleration sensor, a magnetic field sensor, etc., and outputs a specified sensor value. Due to the sensor output of the acceleration sensor, the control unit 3 can determine an operation achieved by lifting and shaking the mobile terminal device 10, and the orientation in which the mobile terminal device 10 is used.

3. Exemplary Layer Configuration

Figure 3:
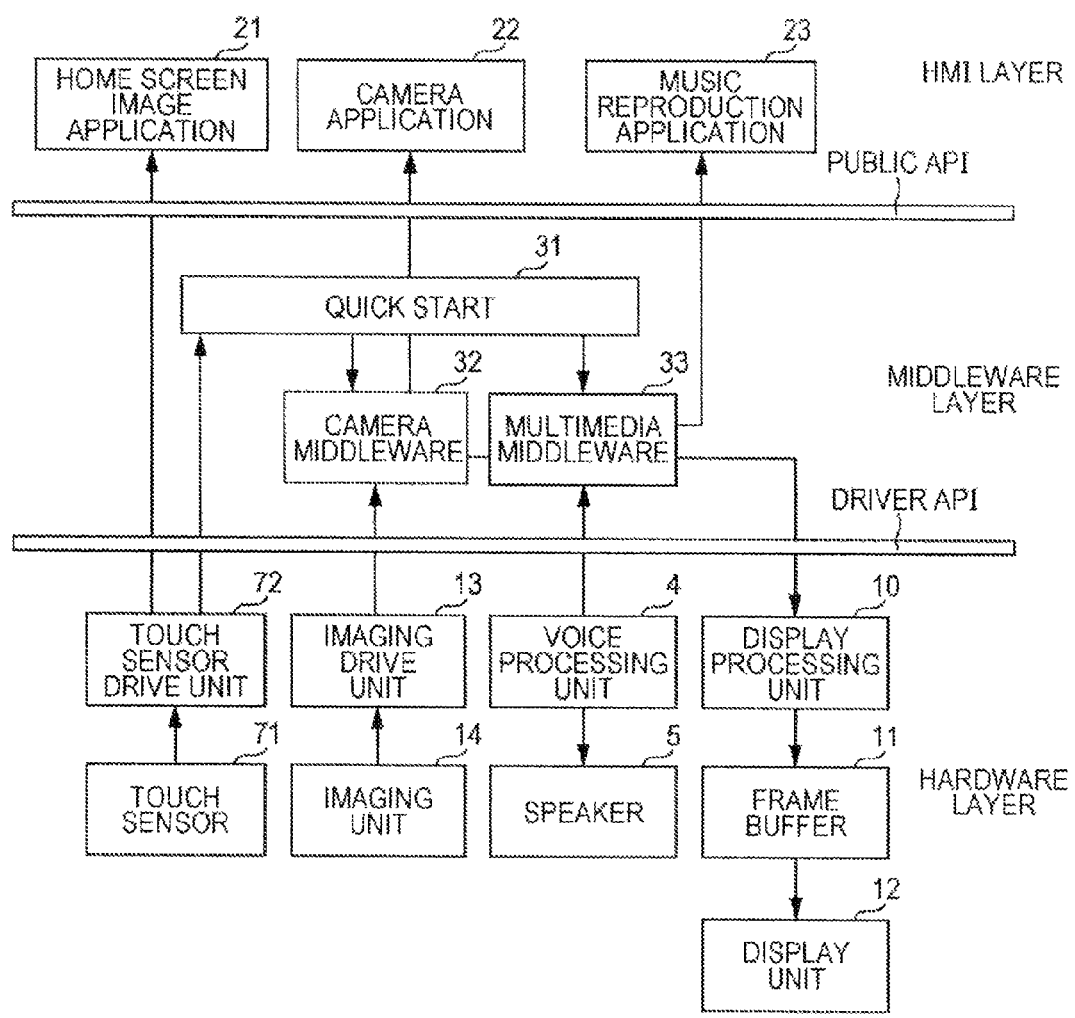
FIG. 3 is an explanatory diagram illustrating an exemplary layer configuration of software and hardware that operate in the mobile terminal device according to the first embodiment of the present disclosure.

FIG. 3 is an explanatory diagram illustrating an exemplary layer configuration of software and hardware that operate in the mobile terminal device 10.

In the mobile terminal device 10, an HMI (Human Machine Interface) layer, a middleware layer, and a hardware layer are set, and various modules operate in relation to one another in each layer. Module groups that are included in the HMI layer and the middle layer are referred to as the software in contrast to the hardware.

In the following description, software administering the operations of applications and middleware that are included in each layer, and the units that are included in the mobile terminal device 10, and the energization, etc. of the units under control of the control unit 3 is referred to as a "system". The system includes, for example, an OS (Operating System), etc. The system performs processing including interrupt control, timeout management, etc., outputs various instructions, etc., collectively manages the operations of the mobile terminal device 10, and performs control to execute resume processing and suspend processing in each unit, for example.

In the hardware layer, the units that are provided in the mobile terminal device 10, which are illustrated in FIG. 2, are included. Between the HMI layer and the middleware layer, data is mutually transferred via a public API (Application Programming Interface) that mediates the processing of various types of application software. Between the middleware layer and the hardware layer, data is mutually transferred via a driver API mediating processing performed for the units that are included in the mobile terminal device 10.

In the HMI layer, various modules including a home screen image application 21, a camera application 22, a music reproduction application 23, etc. are provided. The home screen image application 21 performs control to display a home screen image on the display unit 12. The camera application 22 performs control to display various menus, etc. that are provided to perform imaging through the imaging unit 14. The music reproduction application 23 performs control to cause the voice processing unit 4 to perform codec of voice data, for example.

In the middleware layer, a quick start 31, camera middleware 32, and multimedia middleware 33 are provided. The quick start 31 performs control to resume the system of the mobile terminal device 10 which is in the suspend state. Further, the quick start 31 is used as an interface which starts each of the units of the hardware layer with high speed by performing sequence control during resume processing. As a function allowing the quick start 31 to perform the sequence control, there is one that unarchives a music file of which reproduction is interrupted in a memory and that increases the speed of a read operation to control a series of operations necessary to execute an imaging function and execute a music reproduction function, for example.

The camera middleware 32 converts and transfers an instruction issued from the camera application 22 to the imaging drive unit 13, and notifies the camera application 22 of the operation state of the imaging unit 14, etc., which is received from the imaging drive unit 13. The multimedia middleware 33 accumulates video data, etc. in the frame buffer 11, and outputs the video data read from the frame buffer 11 to the display unit 12 to display video. Further, the multimedia middleware 33 causes the voice processing unit 4 to perform codec processing, etc. for voice data, etc., and outputs the processed voice data to the speaker 5 to emit a voice.

Incidentally, in the past, during processing performed to wake up the system which is in the suspend state through resuming, processing is performed to display a home screen image on the display unit 12 under control of the home screen image application 21. The home screen image that had been started through resuming is in an unlocked state where the user can perform an operation input.

On the other hand, when the system is woken up from the suspend state in the mobile terminal device 10 according to the present embodiment, operations of the units of the hardware layer are directly controlled from the middleware layer without going through the HMI layer. For example, in the mobile terminal device 10, the camera middleware 32 is directly controlled with the quick start 31 without going through an operation of the camera application 22, which allows immediate imaging processing. Likewise, in the mobile terminal device 10, the multimedia middleware 33 is directly controlled with the quick start 31 without going through an operation of the music reproduction application 23, which allows immediate music reproduction processing. Thus, in the mobile terminal device 10, a shortcut function is achieved to immediately execute various functions without going through control performed in the public API.

4. Exemplary Scans Performed for Touch Sensor

Here, exemplary scans that are performed for the touch sensor 71 to detect that an operation input is performed by a finger touching the operation surface of the touch panel 7 will be described with reference to FIGS. 4A, 4B, 5A, 5B, 6A, and 6B.

Figure 4A:
FIGS. 4A and 4B are explanatory diagrams illustrating examples of a usual scan and an intermittent scan that are performed according to the first embodiment of the present disclosure.
Figure 4B:

FIGS. 4A and 4B are explanatory diagrams illustrating examples of a usual scan and an intermittent scan. FIG. 4A illustrates an exemplary usual scan, and FIG. 4B illustrates an exemplary intermittent scan. In FIGS. 4A and 4B, the horizontal axes indicate time (t), and the vertical axes indicate the magnitude of a scan current.

The usual scan illustrated in FIG. 4A is performed when the mobile terminal device 10 is not in the suspend state. During the usual scan, the surface of the touch sensor 71 is scanned at a scan rate of 60 Hz, for example, and the response is increased to send a result back to an operation input from the user. However, since scans are performed with an increased frequency during the usual scan, the power consumption of the touch panel is also increased.

The intermittent scan illustrated in FIG. 4B is performed when the mobile terminal device 10 is in the suspend state. At that time, the touch sensor 71, which is used as an input detection unit, decreases the execution frequency of processing arranged to detect an input operation performed for the touch panel when no input operation performed for the touch panel is detected over a specified time period.

During the intermittent scan, the surface of the touch sensor 71 is scanned at a scan rate of 10 Hz, for example, and a sleep period where the various functions of the mobile terminal device 10 are stopped is provided between each scan. Therefore, the power consumption of the intermittent scan is lower than that of the usual scan. Further, an operation input from the user is performed with a decreased frequency in the suspend state. Accordingly, it is advisable to detect the tap or drag operation when those operations are performed with the minimum frequency. The intermittent scan causes no operability discomfort so long as it is arranged that the usual scan is performed after detecting an operation input from the user and performing the resume processing.

Figures 5A, 5B:
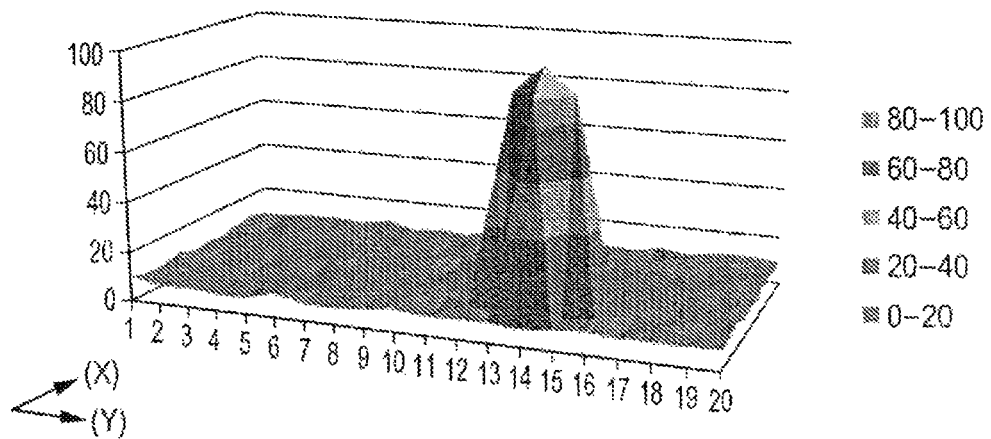
FIGS. 5A and 5B are explanatory diagrams illustrating exemplary capacitance values that are detected with a touch sensor on an operation surface during a touch operation performed in a usual state according to the first embodiment of the present disclosure.

FIGS. 5A and 5B are explanatory diagrams illustrating exemplary capacitance values that are detected with the touch sensor 71 on the operation surface during a touch operation performed in a usual state. FIG. 5A illustrates exemplary capacitance values that are obtained during a touch operation performed in the usual state, and FIG. 5B illustrates exemplary capacitance values that are displayed on a three-dimensional graph. Incidentally, the following description is provided on premises that the short side of the touch panel 7 is determined to be X, the long side is determined to be Y, and the coordinates of the touch panel 7 are equivalent to those of the touch sensor 71 in FIGS. 5A, 5B, 6A, and 6B.

As illustrated in FIG. 5A, a finger touches the position of coordinates (X, Y)=(3, 14) of the touch panel 7. At that time, capacitance values (90 to 100) near the position of coordinates (3, 14) are higher than capacitance values (7 to 10) that are detected at different positions. Consequently, the touch sensor 71 detects that an operation input is performed on the touch panel 7. According to the stereoscopic graph of the capacitance values, which is illustrated in FIG. 5B, it is evident that a capacitance value obtained at the position of coordinates (3, 14) is conspicuous. It is advisable to provide a specified threshold value (e.g., 50) for the capacitance value, and detect a touch operation when the capacitance value exceeds the threshold value.

Figures 6A, 6B:
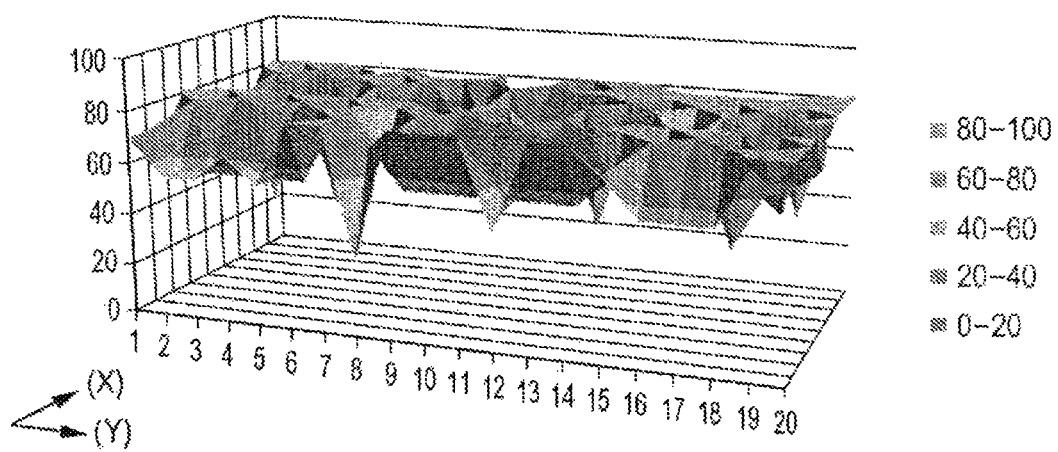
FIGS. 6A and 6B are explanatory diagrams illustrating exemplary capacitance values that are detected with the touch sensor on the operation surface in the state where the mobile terminal device according to the first embodiment of the present disclosure is in a pocket, etc. of a user.

FIGS. 6A and 6B are explanatory diagrams illustrating exemplary capacitance values that are detected with the touch sensor 71 on the operation surface in the state where the mobile terminal device 10 is in a pocket, etc. of the user. FIG. 6A illustrates exemplary capacitance values that are obtained when the mobile terminal device 10 is put into the pocket, etc. of the user, and FIG. 6B illustrates an example where the capacitance values are displayed on a three-dimensional graph.

As illustrated in FIG. 6A, the touch sensor 71 outputs high capacitance values (40 to 80) over the entire face when the mobile terminal device 10 is put into the pocket, etc. of the user, because a human body touches over the entire face of the touch panel 7 via cloth, etc. At that time, since the high capacitance values are detected over the entire face of the touch panel 7, the touch sensor drive unit 72 determines that no intentional operation input is performed by the user, even though an object touches the touch panel 7 for some reason. According to the stereoscopic graph of the capacitance values, which is illustrated in FIG. 6B, it is evident that high capacitance values are detected over the entire face of the touch sensor 71.

Thus, the touch sensor drive unit 72 detects nothing as a touch operation when capacitance values are detected over the entire face of the touch sensor 71, so as not to cause the mobile terminal device 10 to malfunction in the suspend state. Then, the malfunction is avoided by performing control so that specified processing is executed when the touch sensor 71 detects capacitance values for gesture operations that are performed in specific patterns which will be described later.

5. Exemplary Gesture Operations

Next, exemplary gesture operations that are performed according to the present embodiment will be described with reference to FIGS. 7A, 7B, 8A, and 8B.

[5-1. Exemplary Gesture Operations Performed to Start Home Screen Image]

Figure 7A:
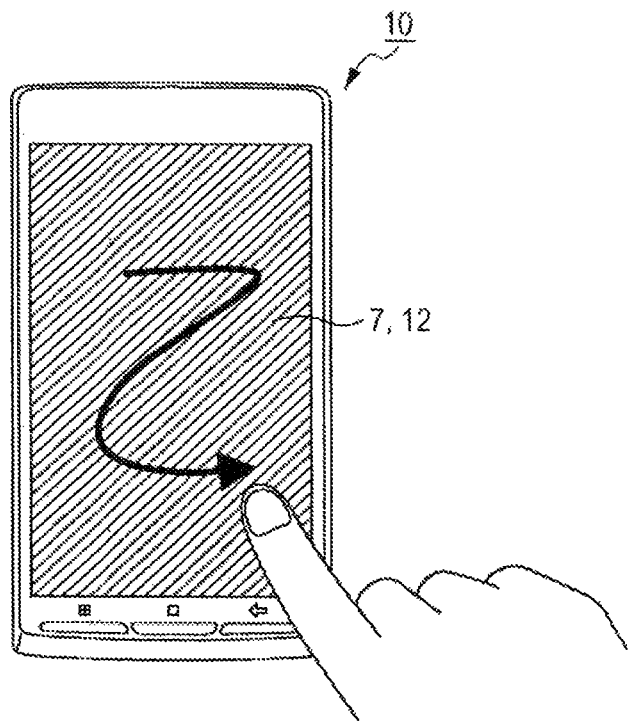
FIGS. 7A and 7B are explanatory diagrams illustrating an example where a home screen image is displayed from a suspend state through a first gesture operation performed according to the first embodiment of the present disclosure.
Figure 7B:
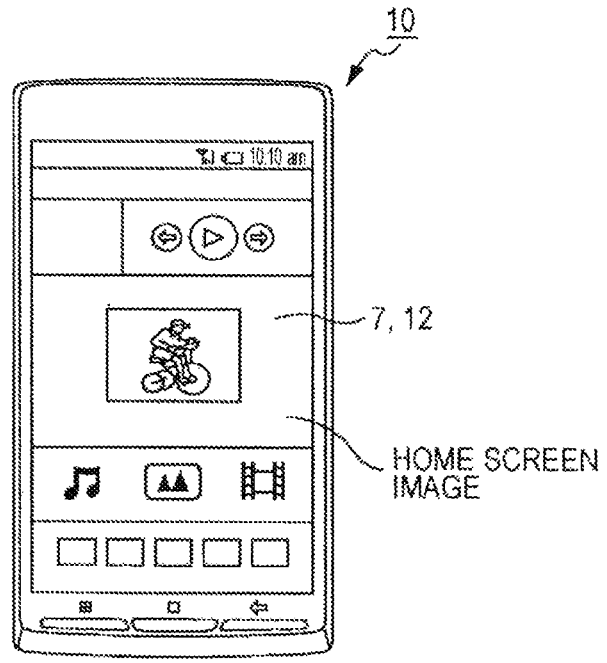

FIGS. 7A and 7B are explanatory diagrams illustrating an example where a home screen image is displayed from the suspend state through a first gesture operation. FIG. 7A illustrates an example of the first gesture operation performed on the touch panel 7 by the user, and FIG. 7B illustrates an exemplary home screen image.

In FIGS. 7A and 7B, an example where the home screen image is started by the user touching the operation surface of the touch panel 7 in place of processing performed in the past to start a home screen image from the suspend state by pressing the power key of the mobile terminal device 100.

Incidentally, even though the mobile terminal device 10 is in the suspend state, intermittently scanning the surface of the touch panel 7 as illustrated in FIG. 4B allows for continuously performing the touch detection processing.

The first gesture operation, which is an exemplary specified input operation, is an operation achieved by sweeping the touch panel 7 in a Z shape (see FIG. 7A) when the mobile terminal device 10 is in the suspend state. When the touch sensor 71 detects that the first gesture operation is performed on the touch panel 7 in the suspend state, the touch sensor drive unit 72 displays a specified screen image on the display unit 12.

At that time, the mobile terminal device 10 starts resuming from the suspend state, and starts the home screen image (see FIG. 7B). Since the home screen image can be directly started from the suspend state without inputting a password, the user can immediately select a menu from the home screen image through an easy operation.

[5-2. Exemplary Gesture Operation Performed to Execute Shooting]

Figure 8A:
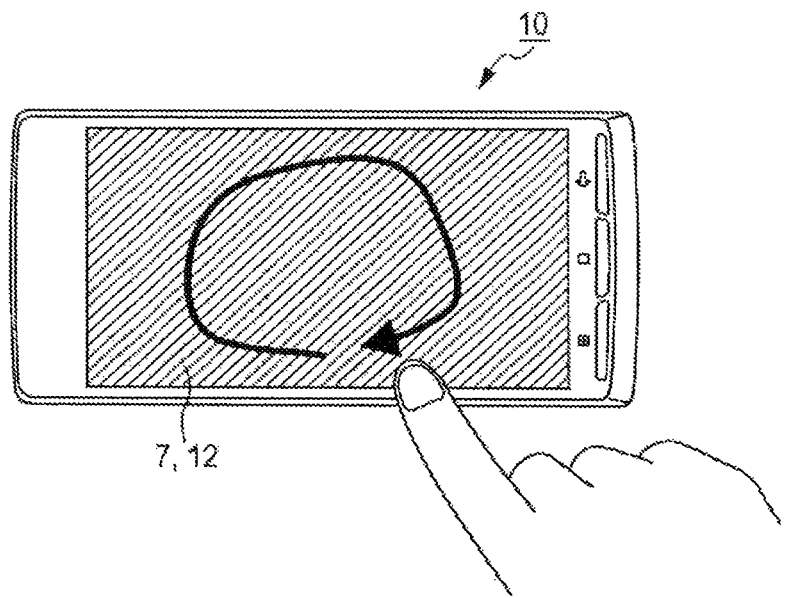
FIGS. 8A and 8B are explanatory diagrams illustrating an example where an imaging function is started from the suspend state and a picture is shot through a second gesture operation performed according to the first embodiment of the present disclosure.
Figure 8B:
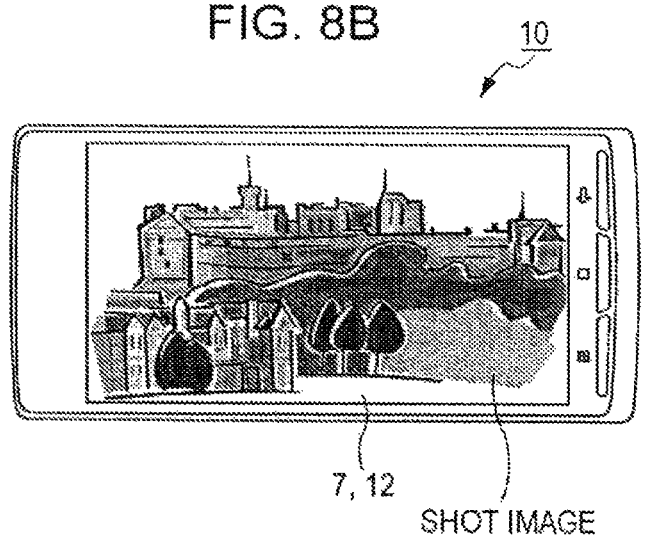

FIGS. 8A and 8B are explanatory diagrams illustrating an example where a second gesture operation is performed to start an imaging function from the suspend state and shoot a picture. FIG. 8A illustrates an example where the second gesture operation is performed on the touch panel 7 by the user, and FIG. 8B illustrates an example where an image obtained through picture shooting is displayed on the display unit 12.

Since the touch sensor drive unit 72 can detect a specific pattern made on the operation surface on the touch panel 7, operations of various applications, other than the function of starting the home screen image from the suspend state as illustrated in FIGS. 7A and 7B, can be combined with specific patterns that are made on the operation surface. A function illustrated in FIGS. 8A and 8B achieves capturing a camera through image shot by the imaging unit 14 by performing a drag operation achieved by drawing a circle with a finger on the operation surface of the touch panel 7 when the mobile terminal device 10 is in the suspend state.

The second gesture operation, which is an exemplary specified input operation, is an operation achieved by sweeping the touch panel 7 in a circular shape (see FIG. 8A) when the mobile terminal device 10 is in the suspend state. When the touch sensor 71 detects that the second gesture operation different from the first gesture operation is performed on the touch panel 7 in the suspend state, the touch sensor drive unit 72 causes the imaging drive unit 13 to start an operation of the imaging unit 14. Then, the touch sensor drive unit 72 causes the display unit 12 to display an image obtained by imaging performed with the imaging unit 14.

At that time, the mobile terminal device 10 starts resuming from the suspend state, starts the imaging drive unit 13, and shoots a subject through the imaging unit 14 without starting the camera application 22 (see FIG. 8B). An image of the subject, which is obtained through the imaging, is displayed on the display unit 12. Since an operation of the imaging unit 14 is not executed after going through an imaging menu from the home screen image, the user can immediately perform imaging at desired time for taking an image of the subject.

Next, an exemplary comparison between the sequence of an example where shooting is performed by starting the camera application 22 through a known operation and that of an example where high-speed shooting is performed through a function according to the present embodiment will be described with reference to FIGS. 9 and 10. Incidentally, the mobile terminal device 10 according to the present embodiment can perform both the known operation and the function according to the present embodiment.

FIG. 9 is a sequence diagram illustrating exemplary processing executed to start the camera application 22 and perform shooting through the known operation.

The known operation allows for starting the camera application 22 after the system of the mobile terminal device 10 is woken up after the user presses the power key in the suspend state. Then, the shooting processing is executed after the camera application 22 is started.

In the following description, the mobile terminal device 10 being in the suspend state or shifting to various modes is expressed by the control unit 3 functioning as a system illustrated in the sequence diagram.

First, it is assumed that the system is in the suspend state (step S1). When the power key included in the operation keys 8 is pressed when the system is in the suspend state, processing performed to resume the system is started (step S2).

At that time, the control unit 3 outputs a resume instruction to the touch sensor drive unit 72 (step S3), the touch sensor drive unit 72 performs resume processing for the touch sensor 71, and the touch sensor 71 waits for an operation performed to detect an input operation (step S4). Then, an unillustrated camera icon provided to start the camera application 22 is displayed on the display unit 12 unillustrated in FIG. 9.

Further, the control unit 3 outputs a resume instruction to the imaging drive unit 13 (step S5), and the imaging drive unit 13 performs resume processing for the imaging element 14a, and waits for an input of an imaging operation (step S6). After resuming processing performed for each unit is finished, the system enters a wakeup state where a response is sent back to an operation input from the user (step S10).

Upon detecting that an input operation achieved with a touch is performed at the position where the camera icon is displayed (step S7), the touch sensor 71 notifies the touch sensor drive unit 72 of the coordinates where the touch is detected (step S8). Further, the touch sensor drive unit 72 notifies the control unit 3 of the coordinates (step S9).

Upon being informed that the input operation is performed for the camera icon through the notification from the touch sensor drive unit 72, the control unit 3 outputs an instruction to start the camera application 22 to the camera application 22 (step S11). Upon receiving the start instruction, the camera application 22 initializes the camera middleware 32 (step S12). Then, the camera middleware 32 outputs an instruction to perform power-on processing and initialization processing to the imaging drive unit 13 (step S13). Accordingly, the imaging drive unit 13 is energized and the initialization processing is performed.

Further, the imaging drive unit 13 outputs an instruction to perform power-on processing and initialization processing to the imaging element 14a (step S14). Accordingly, the imaging element 14a is energized and the initialization processing is performed. Then, a shooting icon provided to specify a shooting operation is displayed on the display unit 12.

Upon detecting that an input operation achieved with a touch is performed at the position where the shooting icon is displayed (step S15), the touch sensor 71 notifies the touch sensor drive unit 72 of the coordinates where the touch is detected (step S16). Further, the touch sensor drive unit 72 notifies the control unit 3 of the coordinates (step S17).

Upon being informed that the input operation is performed for the shooting icon through the notification from the touch sensor drive unit 72, the control unit 3 notifies the camera application 22 of the touched coordinates (step S18). Upon receiving the touched coordinates, the camera application 22 outputs an instruction to start shooting processing to the camera middleware 32 (step S19).

The camera middleware 32 instructs the imaging drive unit 13 to perform processing to capture a shot image (step S20), and the imaging drive unit 13 performs the processing to capture the shot image based on an image signal output from the imaging element 14a (step S21). The image subjected to the capture processing is displayed on the display unit 12.

Thus, according to known processing, the user firstly presses the power button to cancel the suspend state, searches and selects the camera icon on the home screen image displayed through the resume processing, and performs shooting with the shooting icon. Therefore, many procedures are performed from the suspend state until the shooting is started, which leads to complicated operations.

FIG. 10 is a sequence diagram illustrating exemplary processing executed to start the camera application 22 and perform shooting through an operation performed according to the present embodiment.

First, it is assumed that the system is in the suspend state (step S31). When the mobile terminal device 10 is in the suspend state, the intermittent scan is performed for the touch sensor 71 to wait for the detection of a touch operation in the low-power consumption mode where the consumption power is kept low (step S32).

When an operation input is performed on the touch panel 7 through the second gesture operation instructing to start performing shooting, the touch sensor 71 detects that the operation input is performed (step S33). At that time, the touch sensor 71 outputs a particular interrupt instruction issued to wake up the system to the touch sensor drive unit 72 (step S34).

Incidentally, when the control unit 3 is in the suspend state, no processing is performed upon receiving a usual interrupt instruction. However, the particular interrupt instruction instructs the control unit 3 to start performing resume processing. Therefore, upon receiving the particular interrupt instruction, the control unit 3 starts performing the resume processing and performs processing to cause a transition from the suspend state to a wakeup state.

The touch sensor drive unit 72 outputs an instruction to start resume processing for the system to the control unit 3 as the particular interrupt instruction (step S35). Accordingly, the control unit 3 starts performing the resume processing for the system (step S36).

Further, the touch sensor drive unit 72 outputs an instruction to perform wakeup processing for the camera middleware 32, and an instruction specifying the start of capture processing to the quick start 31 (step S37). Upon receiving the instructions from the touch sensor drive unit 72, the quick start 31 outputs the instruction to perform the wakeup processing for the camera middleware 32 to the camera middleware 32, and outputs the instruction specifying the start of the capture processing (step S38).

After performing the wakeup processing, the camera middleware 32 outputs an instruction to perform power-on processing and initialization processing to the imaging drive unit 13 (step S39). Accordingly, the imaging drive unit 13 is energized and the initialization processing is performed.

Further, the imaging drive unit 13 outputs an instruction to perform power-on processing and initialization processing to the imaging element 14a (step S40). Accordingly, the imaging element 14a is energized and the initialization processing is performed. Then, the shooting icon provided to specify the shooting operation is displayed on the display unit 12.

The resume processing performed for the system is finished, and the control unit 3 enters the wakeup state (step S41). Next, the camera middleware 32 instructs the imaging drive unit 13 to perform processing to capture a shot image (step S42). At that time, the camera middleware 32 outputs an instruction to start the camera application 22 (step S43).

Then, the imaging drive unit 13 performs the processing to capture the shot image based on an image signal output from the imaging element 14a (step S44). The image subjected to the capture processing is displayed on the display unit 12. Then, for the image displayed on the display unit 12, an operation menu, etc. provided due to the start of the camera application 22 is displayed on the display unit 12.

Thus, processing or software executed through the second gesture operation is limited. Then, the camera application 22 is started after capturing the image immediately after detecting the gesture operation, which minimizes the time that elapses before the shooting is started. Accordingly, it becomes possible to shoot the subject at the moment the user wishes to shoot, and eliminate the user's complaint about missing timing by taking too much time on startup for performing shooting through the mobile terminal device 10 which is in the suspend state.

[5-3. Exemplary Gesture Operation Executed to Perform Music Reproduction]

Next, an exemplary gesture operation executed to perform the music reproduction will be described with reference to FIGS. 11A, 11B, and 12.

Figure 11A:
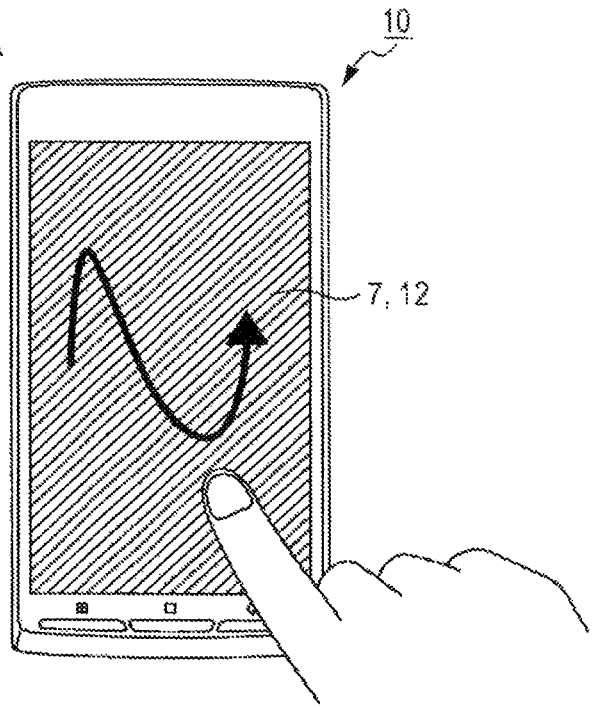
FIGS. 11A and 11B are explanatory diagrams illustrating an example where a music reproduction function is started from the suspend state and a music file is reproduced through a third gesture operation performed according to the first embodiment of the present disclosure.
Figure 11B:
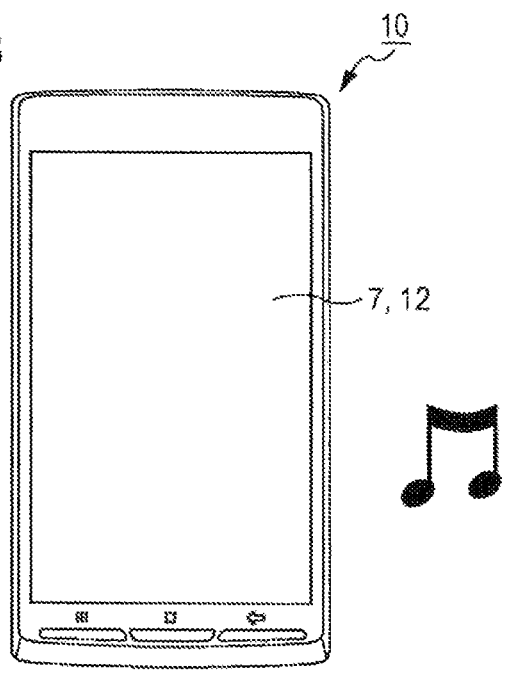

FIGS. 11A and 11B are explanatory diagrams illustrating an example where a music reproduction function is started from the suspend state and a music file is reproduced through a third gesture operation. FIG. 11A illustrates an example of the third gesture operation performed on the touch panel 7 by the user, and FIG. 11B illustrates an example where music is emitted by reproducing the music file.

The music reproduction function described here reduces the time that elapses before the music reproduction is started when an operation is performed on the touch panel 7 through a specific gesture. Incidentally, as being operated with low power consumption, the mobile terminal device 10 is in an early suspend state where the display unit 12 is in the suspend state and no image is displayed.

The third gesture operation, which is an exemplary specified input operation, is an operation achieved by sweeping the touch panel 7 in an N shape (see FIG. 11A) when the mobile terminal device 10 is in the suspend state. When the touch sensor 71 detects that the third gesture operation is performed on the touch panel 7 in the suspend state, the touch sensor drive unit 72 causes the voice processing to start performing voice processing, and causes a sound emitting unit to emit a voice.

At that time, the mobile terminal device 10 starts performing resuming from the suspend state, starts the voice processing unit 4, and emits reproduced music through the speaker 5 (see FIG. 11B). When the display unit 12 is started in the early suspend state, various information relating to the music which is being reproduced (e.g., the track name, the singer's name, and so forth) is not displayed on the display unit 12. However, it may be arranged that the display unit 12 is started and the various information relating to the music which is being reproduced is displayed on the display unit 12.

Figure 12:
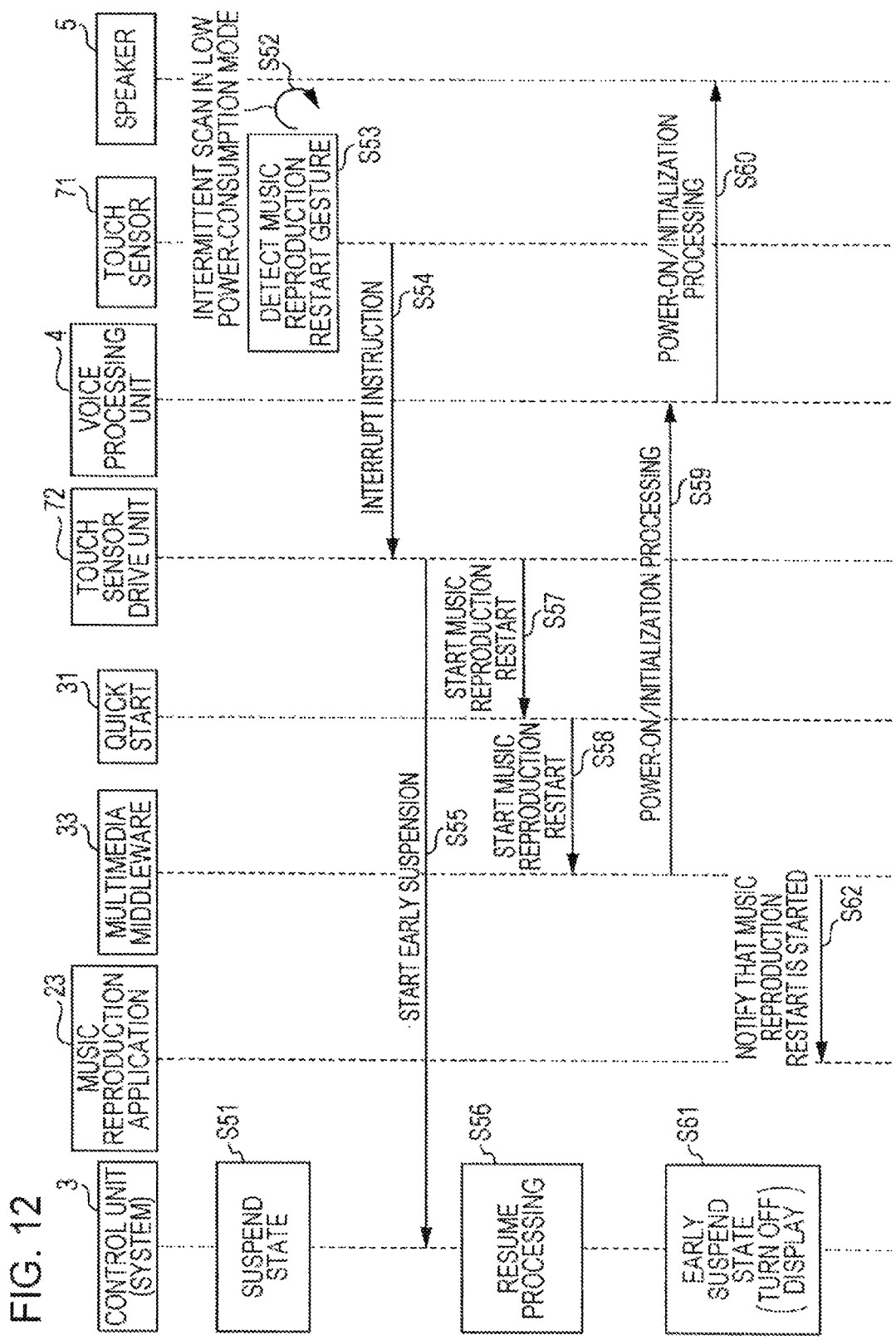
FIG. 12 is a sequence diagram illustrating exemplary processing executed to start a music reproduction application 23 and reproduce music through an operation performed according to the first embodiment of the present disclosure.

FIG. 12 is a sequence diagram illustrating exemplary processing executed to start the music reproduction application 23 and reproduce music through an operation according to the present embodiment.

First, it is assumed that the system is in the suspend state (step S51). When the mobile terminal device 10 is in the suspend state, the intermittent scan is performed for the touch sensor 71 to wait for the detection of a touch operation in the low-power consumption mode (step S52).

When an operation input is performed on the touch panel 7 through a gesture performed to restart the music reproduction (the third gesture operation), the touch sensor 71 detects that the operation input is performed (step S53). At that time, the touch sensor 71 outputs a particular interrupt instruction to the touch sensor drive unit 72 (step S54).

The touch sensor drive unit 72 outputs an instruction to start resume processing for the system and start the early suspend state to the control unit 3, as a particular interrupt instruction (step S55). Consequently, the control unit 3 starts performing the resume processing for the system (step S56).

Further, the touch sensor drive unit 72 outputs an instruction to perform processing to restart the music reproduction of the multimedia middleware 33 to the quick start 31 (step S57). Upon receiving the instruction from the touch sensor drive unit 72, the quick start 31 outputs the instruction to perform the processing to restart the music reproduction of the multimedia middleware 33 to the multimedia middleware 33 (step S58).

After that, the multimedia middleware 33 outputs an instruction to perform power-on processing and initialization processing to the voice processing unit 4 (step S59). Accordingly, the voice processing unit 4 is energized and the initialization processing is performed.

Further, the voice processing unit 4 outputs an instruction to perform the power-on processing and the initialization processing to the speaker 5 (step S60). Accordingly, the speaker 5 is energized, the initialization processing is performed, and reproduced music is emitted.

After that, when the resume processing performed for the system is finished, the system enters the early suspend state (step S61). At that time, an off state is achieved so that no image is displayed on the display unit 12. Then, when the system enters the early suspend state, the multimedia middleware 33 transmits a start notification indicating that the music reproduction is restarted to the music reproduction application 23 (step S62). Upon receiving the notification, the music reproduction application 23 is started.

The above-described mobile terminal device 10 according to the first embodiment allows for immediately executing a specific function in the suspend state when an operation input is performed on the touch panel 7 through a specific gesture operation. Here, the modules that are provided in the middleware layer directly output instructions and instruct the units that are included in the hardware layer to start performing operations without going through the various applications that are provided in the HMI layer (see FIG. 3).

Therefore, the user is allowed to execute various functions that are allocated to specific gesture operations without waiting for the time-consuming start of the various applications that are provided in the HMI layer, which leads to increased operability.

Further, when the first gesture operation is performed on the touch panel 7 of the mobile terminal device 10 which is in the suspend state, the home screen image is started without operating the operation key 8. When each user can separately set the first gesture operation to start the home screen image, the password input can be omitted by using the first gesture operation which is only known by the user in place of the password input.

Further, when the second gesture operation is performed on the touch panel 7, shooting can be started by immediately starting the imaging drive unit 13 and the imaging unit 14. In that case, the shooting can also be performed without waiting for the start of the camera application 22, which takes much time before the start, which avoids losing the imaging timing.

Further, when the third gesture operation is performed on the touch panel 7, the music reproduction can be started by immediately starting the music reproduction unit 4. By restarting the reproduction from some midpoint in a track, where the music reproduction had been stopped, the user is allowed to reproduce and immediately enjoy music he had been listening to until the use of the mobile terminal device 10 was stopped.

Further, when the mobile terminal device 10 is in the suspend state, the power consumption can be reduced by performing the intermittent scan. Further, a distribution of capacitance values is obtained when the area where the touch sensor 71 detects an operation input is part of or the entire face of the touch sensor 71, which allows for separately determining whether or not the user intentionally performed the operation input. Therefore, for an unintentional operation input which is performed when a human body indirectly touches the touch panel 7 of the mobile terminal device 10 which is put into a pocket by the user, it becomes possible to avoid erroneously determining that an operation input is done.

Incidentally, for the mobile terminal device 10 according to the first embodiment, exemplary applications regarding the startup of the home screen image, the shooting, and the music reproduction have been described. Additionally, however, any application may be used so long as it is desired to be immediately started for use. For example, a map application illustrating the current value, etc., or an application that logs into SNS (Social Networking Service) or makes access to a blog site or a news site may be used.

Second Embodiment

6. Example where Operation is Performed in Concert with Another Device

Next, the mobile terminal device 10 according to a second embodiment of the present disclosure will be described with reference to FIG. 13.

The mobile terminal device 10 according to the second embodiment immediately achieves a function used by a user not only by various gesture operations that are operation-input to the touch panel 7, but also by combining a sensor value output from the sensor unit 18.

When the touch sensor 71 detects that a specified input operation is performed on the touch panel 7 in the suspend state, the touch sensor drive unit 72 selects a single controlled unit from among plural types of controlled units based on the sensor value, and causes the selected controlled unit to execute a specified operation.

Figure 13:
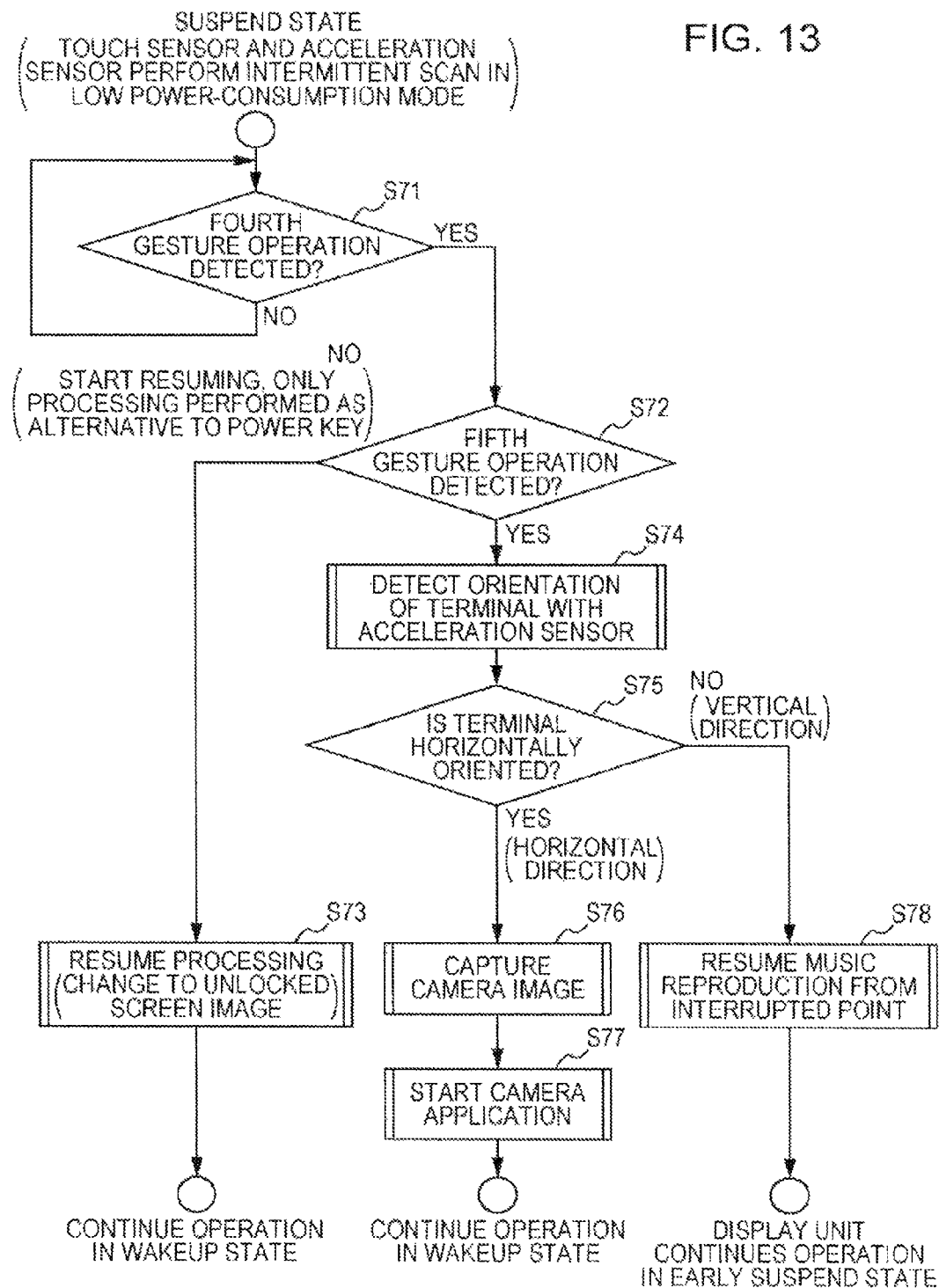
FIG. 13 is a flowchart illustrating exemplary processing performed to execute various functions by combining a gesture operation performed according to a second embodiment of the present disclosure with an acceleration value detected with an acceleration sensor.

FIG. 13 is a flowchart illustrating exemplary processing performed to execute various functions by combining a gesture operation with an acceleration value detected with the acceleration sensor.

It is assumed that the mobile terminal device 10 is in the suspend state. Then, it is also assumed that the touch sensor 71 performs the intermittent scan (see FIG. 4B), and as for a sensor value (acceleration value) from the acceleration sensor included in the sensor unit 18, the sensor value is output at the same scan rate as that of the intermittent scan.

First, the touch sensor drive unit 72 determines whether or not a fourth gesture operation achieved to start a shortcut function executing various functions without going through an application is performed on the touch panel 7 (step S71). Here, since the fourth gesture operation, which is an exemplary specified input operation, is not used to select a desired function to be executed, it may be equivalent to or different from any one of the above-described first to third gesture operations. When the fourth gesture operation is not detected, the determination processing of step S71 is repeated.

Next, it is determined whether or not the touch sensor 71 detects a fifth gesture operation (e.g., a double tap) achieved to perform a quick operation (step S72). The fifth gesture operation includes, for example, an operation achieved by tapping the touch panel 7 twice.

When the fifth gesture operation is not performed, resume processing is started for the system (step S73). The resume processing described here is an alternative to the processing performed to start a home screen image by pressing the power key, for example. Then, the display unit 12 is caused to display an unlocked home screen image and operations are continued in the state where the system wakes up.

When the fourth gesture operation is performed at step S72, the quick start 31 detects the orientation of the mobile terminal device 10 based on the sensor value received from the acceleration sensor (step S74). Then, it is determined whether or not the orientation is the lateral direction of the mobile terminal device 10 (step S75). Here, the mobile terminal device 10 being oriented in the lateral direction indicates being at rest in the state where the long side of the cabinet 19 of the mobile terminal device 10 is almost parallel to the horizontal. Further, the mobile terminal device 10 being oriented in a vertical direction indicates being at rest in the state where the long side of the cabinet 19 of the mobile terminal device 10 is almost parallel to a vertical line.

Upon determining that the mobile terminal device 10 is oriented in the lateral direction, the quick start 31 instructs each unit to start the above-described processing illustrated in FIG. 10. Then, the imaging unit 14 performs capture processing for an image of the subject, which is obtained through imaging, for display on the display unit 12 (step S76). After that, the camera application 22 is started (step S77), and the operations of the imaging unit 14 are continued in the state where the system wakes up.

Upon determining that the mobile terminal device 10 is oriented in the vertical direction, the quick start 31 instructs each unit to start the above-described processing illustrated in FIG. 12. Then, the voice processing unit 4 causes the speaker 5 to emit music of which reproduction is restarted from the spot where the music reproduction is stopped (step S78). After that, the music reproduction application 23 is started, and the operations of the voice processing unit 4 are continued in the state where the system wakes up.

The above-described mobile terminal device 10 according to the second embodiment determines the type of an operation input performed for the mobile terminal device 10 based on a sensor value (acceleration value) from the acceleration sensor included in the sensor unit 18, in addition to a gesture operation performed on the touch panel 7. At that time, starting the music reproduction in accordance with a gesture operation performed in the state where the mobile terminal device 10 is held in the vertical direction, and immediately starting performing imaging with the imaging unit 14 in accordance with a gesture operation performed in the state where the mobile terminal device 10 is held in the lateral direction are achieved.

Further, when the sensor unit 18 includes a gyro sensor, the direction in which the mobile terminal device 10 is placed may be determined based on a sensor value transmitted from the gyro sensor. Likewise, the orientation of the mobile terminal device 10 may be determined through the use of a magnetic field sensor. Further, at step S72, a transition to the unlocked screen image is caused when the tap operation is performed. However, the processing of step S72 may be omitted. In that case, the orientation of the mobile terminal device 10 can be detected immediately after the shortcut function is started.

Further, during branch processing of step S72 of FIG. 13, it may be arranged that the unlocked screen image is displayed after the double tap is detected, and a specified application is started after a password is input by the user.

Third Embodiment

7. Example where Application is Started Through Two-Step Gesture Operation

Next, the mobile terminal device 10 according to a third embodiment of the present disclosure will be described with reference to FIGS. 14A, 14B, 14C, 14D, and 14E.

The mobile terminal device 10 according to the third embodiment immediately achieves a specific function when an operation input is performed on the touch panel 7 in two steps.

Figure 14A:
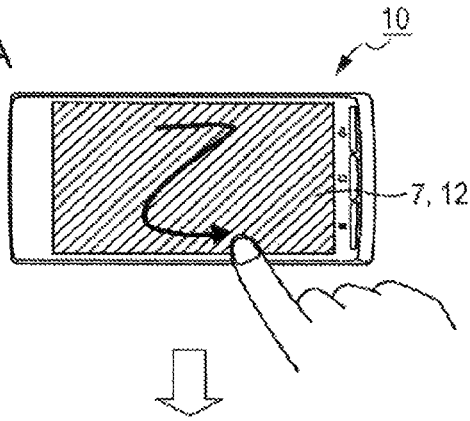
FIGS. 14A, 14B, 14C, 14D and 14E are explanatory diagrams illustrating an exemplary operation arranged to start an application through a two-step gesture operation performed according to a third embodiment of the present disclosure.
Figure 14B:
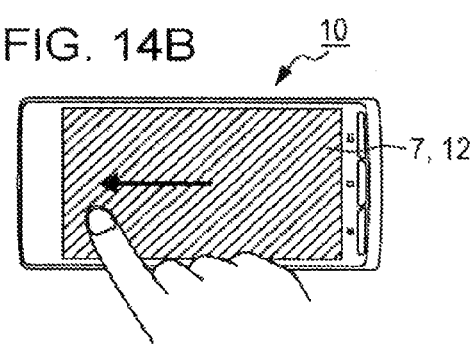
Figure 14C:
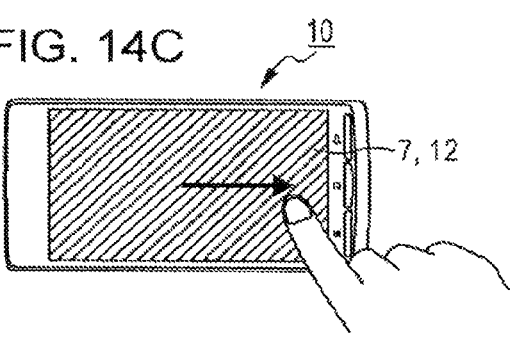
Figure 14D:
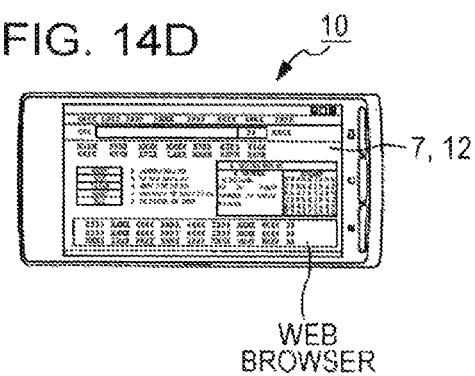
Figure 14E:
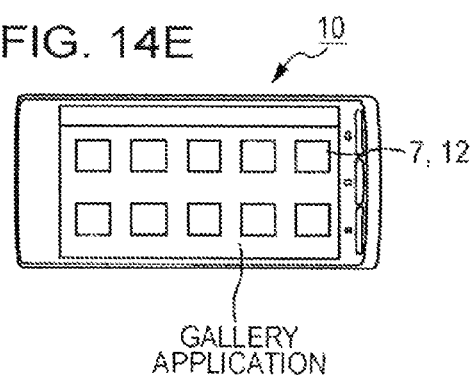

FIGS. 14A, 14B, 14C, 14D, and 14E are explanatory diagrams illustrating an exemplary operation performed to start an application through a two-step gesture operation. FIG. 14A illustrates an exemplary first-step gesture operation, FIGS. 14B and 14C illustrate exemplary second-step gesture operations, and FIGS. 14D and 14E illustrate exemplarily started applications.

In the mobile terminal device 10 according to the third embodiment, an application is immediately executed not only through the gesture operation performed at the first step. The gesture operation performed at the first step is only a preliminary operation, and the application is executed through the gesture operation performed at the second step.

Then, when the touch sensor 71 detects that different gestures are performed plural times on the touch panel 7 in predetermined order in the suspend state, the touch sensor drive unit 72 causes a controlled unit associated with a different input operation to execute a specified operation.

First, it is assumed that the user performs an input operation in the state where the long side of the cabinet 19 of the mobile terminal device 10 is almost parallel to the horizontal. For example, the gesture operation of the first step is an operation achieved by the user sweeping the touch panel 7 in a Z shape when the mobile terminal device 10 is in the suspend state (see FIG. 14A).

For starting a Web browser, the user performs an operation by sweeping a finger from near the center of the touch panel 7 toward the left direction in a straight line (see FIG. 14B) as the gesture operation of the second step. After the operation, the mobile terminal device 10 connects to the Internet and the Web browser is started so that an accessed site can be displayed on the display unit 12 (see FIG. 14D).

On the other hand, for starting a gallery application of a picture, the user performs an operation by sweeping a finger from near the center of the touch panel 7 toward the right direction (see FIG. 14C) as the gesture of the second step. After the operation, the mobile terminal device 10 can start the gallery application and display a shot image or video read from the storage unit 15 on the display unit 12 as a thumbnail (see FIG. 14E).

The above-described mobile terminal device 10 according to the third embodiment allows for starting plural types of applications by combining different gestures in two steps. As stated above, the applications for starting include the Web browser, the gallery application, etc. When the gallery application is started, a specific page may be displayed at the outset. Further, when the Web browser is started, a search page arranged to make a word search may be displayed so that the user can immediately make the word search. Further, a specific URL may be specified as an argument (parameter) passed to an application on startup.

Further, the gesture operation, which exemplarily includes the operation achieved by sweeping the finger caused to touch the touch panel 7 in a Z shape and that achieved by sweeping in the horizontal direction, may be combined with a different gesture operation including, for example, an operation achieved by tapping or sweeping the touch panel 7 in a circular shape. Further, an application may be started by performing a two-step gesture operation while holding the mobile terminal device 10 in a vertical direction. Further, gesture operations may be combined in three or more steps, even though the combination leads to complicated operations.

Fourth Embodiment

8. Exemplary Assistance Function Started when Gesture Operation Ends in Failure

Next, the mobile terminal device 10 according to a fourth embodiment of the present disclosure will be described with reference to FIGS. 15A, 15B, 15C, 15D, and 16.

The mobile terminal device 10 according to the fourth embodiment displays a guide arranged to assist a gesture operation when the gesture operation ends in failure, which makes it impossible to start an application.

Figure 15A:
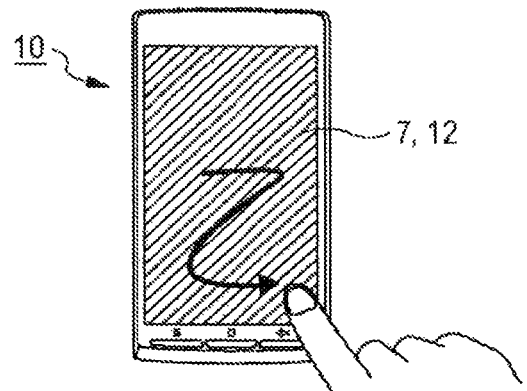
FIGS. 15A, 15B, 15C, and 15D are explanatory diagrams illustrating exemplary assistance processing performed when a gesture operation ends in failure according to a fourth embodiment of the present disclosure.
Figure 15B:
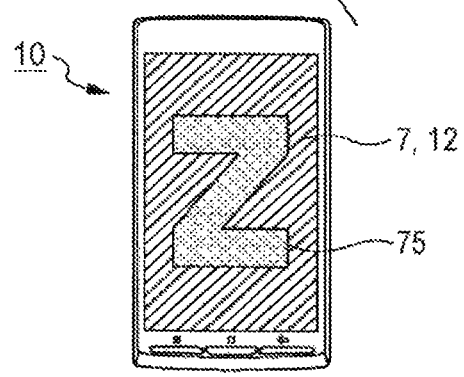
Figure 15C:
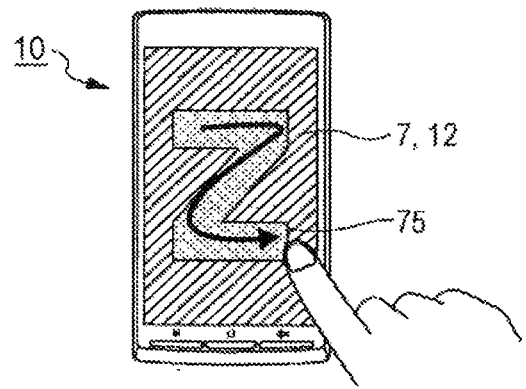
Figure 15D:
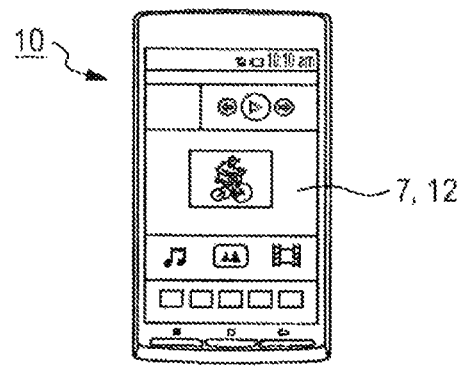

FIGS. 15A, 15B, 15C, and 15D are explanatory diagrams illustrating exemplary assistance processing performed when a gesture operation ends in failure. FIG. 15A illustrates an example where a gesture operation ends in failure, and FIG. 15B illustrates an example where the guide is displayed on the display unit 12. Further, FIG. 15C illustrates an example where the gesture operation is performed again along the guide, and FIG. 15D illustrates an example where an application is successfully started.

The above-described gesture operations that are performed according to the first to third embodiments are performed for the mobile terminal device 10 which is in the suspend state. However, since nothing is displayed on the display unit 12 when the mobile terminal device 10 is in the suspend state, the gesture operations are often performed at wrong positions, which makes it impossible to start an application (see FIG. 15A).

At that time, when the touch sensor 71 detects that a specified input operation is similar to a stipulated input operation, the touch sensor drive unit 72 causes the display unit 12 to display a guide representing the stipulated input operation. Then, when the touch sensor 71 detects that an input operation performed again on the touch panel 7 in accordance with the guide is the stipulated input operation, a controlled unit associated with the stipulated input operation is instructed to execute a specified operation.

Specifically, the mobile terminal device 10 according to the fourth embodiment displays a guide 75 on the display unit 12 as a function of complementing a gesture operation (see FIG. 15B). For example, when a gesture operation that can be detected with the touch sensor 71 is an operation achieved by sweeping the touch panel 7 in a Z shape near the center of the touch panel 7, the guide 75 displays a Z-shaped effective area on the display unit 12.

At that time, the user performs a gesture operation by referring to the guide 75 displayed on the display unit 12 (see FIG. 15C). When a sweeping operation is performed by a finger which is kept in contact with the touch panel 7 in the effective area of the guide 75, the touch sensor 71 recognizes that the gesture operation is performed with increased reliability. Further, the width of the displayed guide 75 is wider than that of the finger. Therefore, the user can perform the gesture operation while keeping the finger from deviating from the guide 75. When the gesture operation is recognized, an application is successfully started, and an application startup is performed (see FIG. 15D).

Further, for displaying the guide 75, the resume processing performed for the mobile terminal device 10 operates. However, the operation only causes the guide 75 to be displayed without displaying a locked screen image. Further, for determining that a gesture operation ends in failure, it is necessary to make sure not to react in such a way as to deal with a gesture operation that ends in failure when a touch operation is performed in the case where the mobile terminal device 10 is put into a pocket, or a finger touches the touch panel 7 just a little. This is because displaying the guide 75 consumes too much power. Therefore, it is desirable to make a comparison between a stipulated gesture operation and an operation detected with the touch sensor 71, and display the guide 75 when a similarity between the operations is confirmed.

Figure 16:
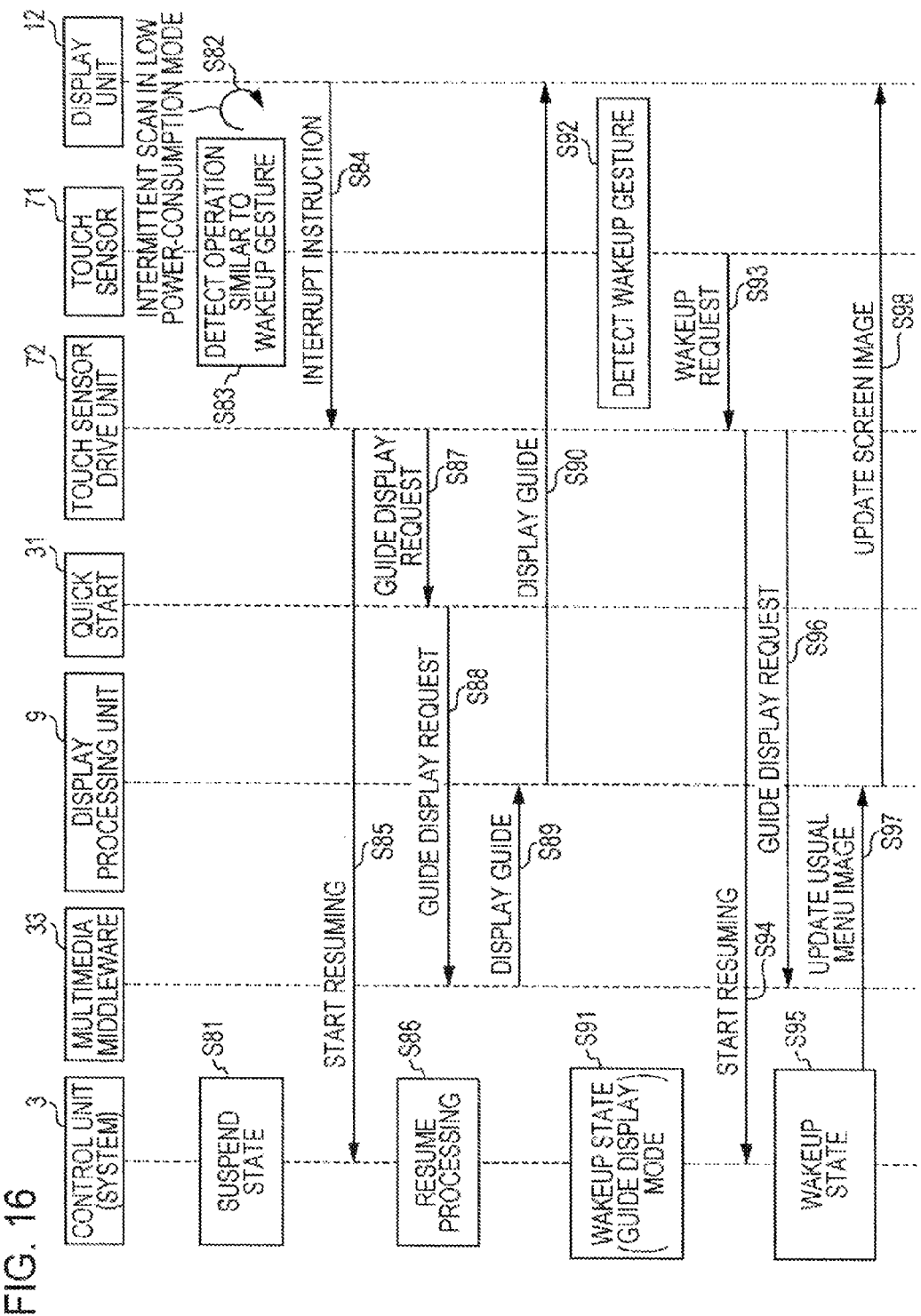
FIG. 16 is a sequence diagram illustrating exemplary processing performed to execute an assistance function according to the fourth embodiment of the present disclosure.
Figure 17A:
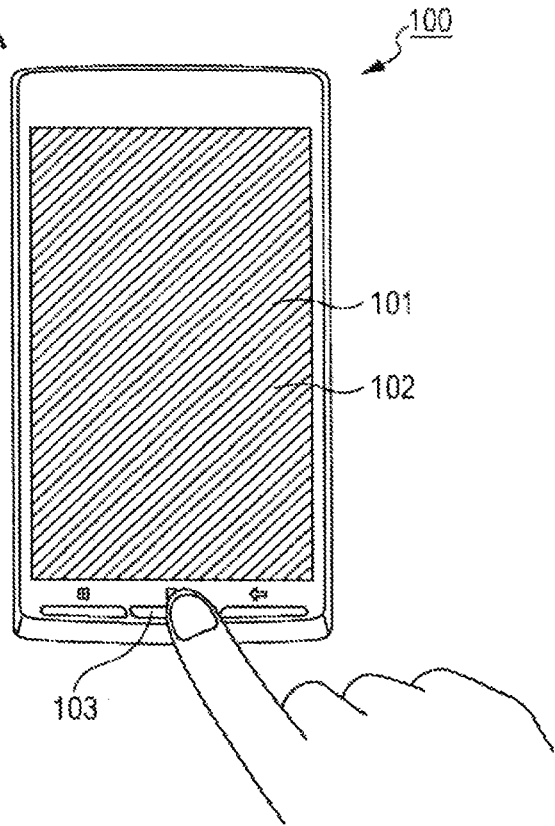
FIGS. 17A and 17B are schematic diagrams illustrating an exemplary external configuration of a known mobile terminal device.
Figure 17B:
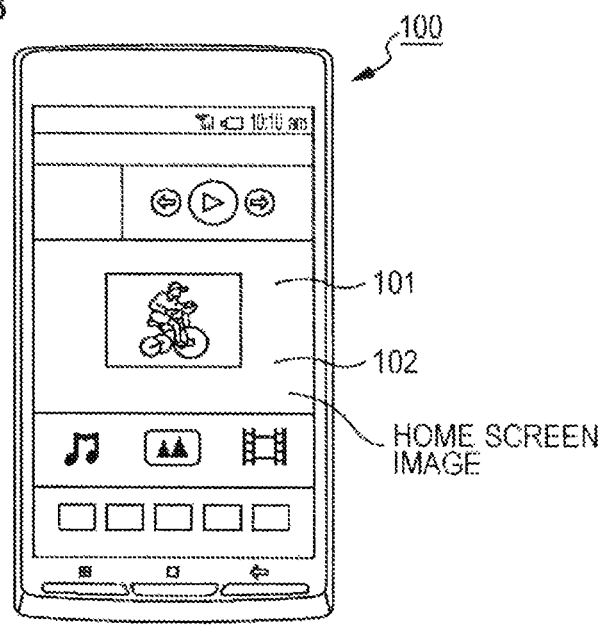

FIG. 16 is a sequence diagram illustrating exemplary processing performed to execute the assistance function.

First, it is assumed that the system is in the suspend state (step S81). When the mobile terminal device 10 is in the suspend state, the intermittent scan is performed for the touch sensor 71 to wait for the detection of a touch operation in the low-power consumption mode (step S82).

The touch sensor 71 detects that an operation similar to a gesture operation that wakes up the system (referred to as "wakeup gesture" in the drawing) is performed on the touch panel 7 (step S83). At that time, the touch sensor 71 outputs a particular interrupt instruction to the touch sensor drive unit 72 (step S84).

The touch sensor drive unit 72 outputs an instruction to start resume processing performed for the system and start performing the resume processing to the control unit 3 as the particular interrupt instruction (step S85). Consequently, the control unit 3 starts performing the resume processing for the system (step S86).

When the control unit 3 starts performing the resume processing, the touch sensor drive unit 72 outputs a guide display request issued to display the guide 75 to the quick start 31 (step S87). Upon receiving the guide display request from the touch sensor drive unit 72, the quick start 31 outputs the guide display request to the multimedia middleware 33 (step S88). Here, the multimedia middleware 33 has a guide display function provided to find a gesture operation similar to a hard-to-determine operation when the operation is performed on the touch panel 7 and cause the display unit 12 to display the guide 75.

Upon receiving the guide display request from the touch sensor drive unit 72, the multimedia middleware 33 outputs an instruction to perform the guide display to the display processing unit 9 (step S89). Then, the display processing unit 9 stores an image of the guide 75 in the frame buffer 11. The display unit 12 displays the guide 75 based on the image read from the frame buffer 11 (step S90). After that, the control unit 3 causes the system to enter the wakeup state (step S91), and waits until a gesture operation is input again. At that time, the system is in a guide display mode where the guide 75 is displayed on the display unit 12.

When the touch sensor 71 detects a gesture operation that wakes up the system in the guide display mode (step S92), the touch sensor 71 outputs an instruction requesting that the system be woken up to the touch sensor drive unit 72 (step S93). An instruction to start the resume processing performed for the system and start performing the resume processing is output to the control unit 3 (step S94). Consequently, the control unit 3 causes the system to enter the wakeup state (step S95).

After that, the touch sensor drive unit 72 outputs a guide display request to display the guide 75 to the multimedia middleware 33 (step S96). Further, an instruction to update and display a menu image attained in the usual state on the display unit 12 is output from the system which had entered the wakeup state to the frame buffer 11 (step S97). The frame buffer 11 performs processing to update the menu image displayed on the display unit 12 (step S98).

The above-described mobile terminal device 10 according to the fourth embodiment is effective when a gesture operation that wakes up the system cannot be recognized due to a drag position drift, etc. In that case, when an operation similar to a stipulated gesture operation is performed, the guide 75 is displayed on the display unit 12 so that an operation is performed again. Then, a specified function is executed based on a gesture operation performed along the guide 75. Consequently, since no image is displayed on the mobile terminal device 10 which is in the suspend state, the user who had failed in a gesture operation is allowed to perform a gesture operation along the guide 75 at the re-operation time so that an input operation can be performed with reliability.

Further, when a gesture operation ends in failure, the system is not fully woken up. However, the system changes to the guide display mode and continuously waits until a gesture operation is performed. Then, after detecting an appropriate gesture operation performed again, the system wakes up into the usual state. From then on, the screen image update, operations, and so forth are performed in the usual state.

Further, it may be arranged that the locus of a gesture operation is displayed on the operation surface of the touch panel 7. The displayed locus allows the user to easily recognize how the input operation ends in failure.

Fifth Embodiment

Next, the mobile terminal device according to a fifth embodiment of the present disclosure will be described with reference to FIG. 18 through FIG. 28B.

Figure 18:
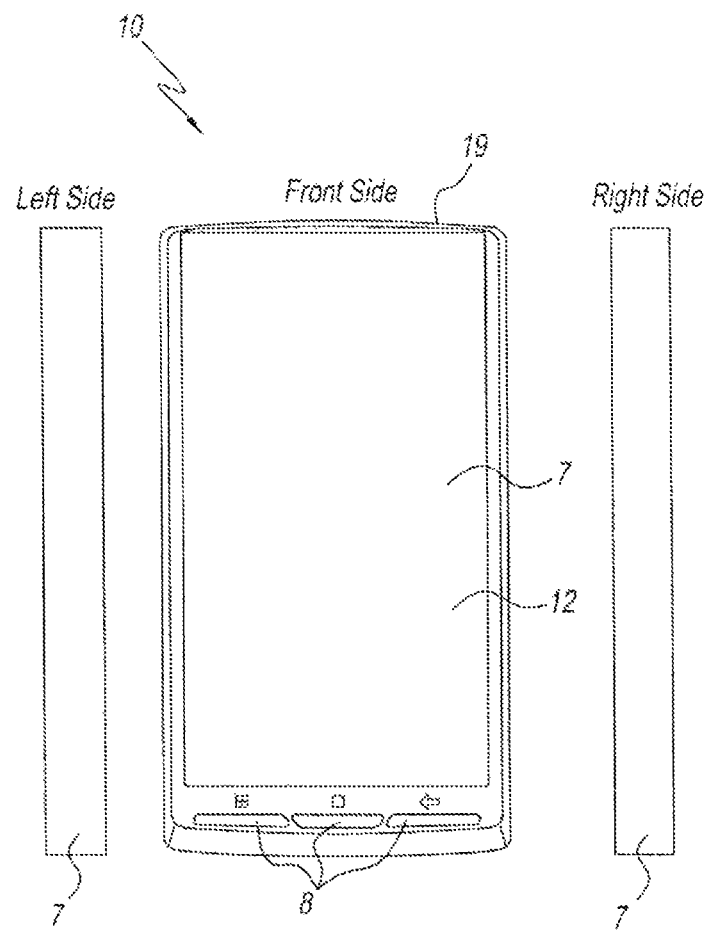
FIG. 18 is a schematic diagram illustrating an exemplary external configuration of a mobile terminal device according to a fifth embodiment of the present disclosure.

FIG. 18 is a schematic diagram illustrating an exemplary external configuration of a mobile terminal device according to a fifth embodiment of the present disclosure. In this embodiment, the touch panel 7 includes plurality of panels, such as a front panel located on a front side of the mobile terminal device 10, side panel(s) located on lateral side(s) of the mobile terminal device 10 and/or a back panel (not shown) located on a back side of the mobile terminal device 10. For example, when an input operation is not detected by the front panel over a specified time period (e.g. 15 seconds), a frequency of detection (scan rate) by the front panel may be decreased anywhere from 60 Hz to 5 Hz or even 0 Hz (e.g. deep sleep mode or power off mode) and a frequency of detection (scan rate) by the side panels may be decreased from 60 Hz to 10 Hz (low power scanning mode). Thus, in this embodiment, the frequency of detection by the front panel may be lower than that of side panels so that power consumption may be reduced.

Figure 19B:
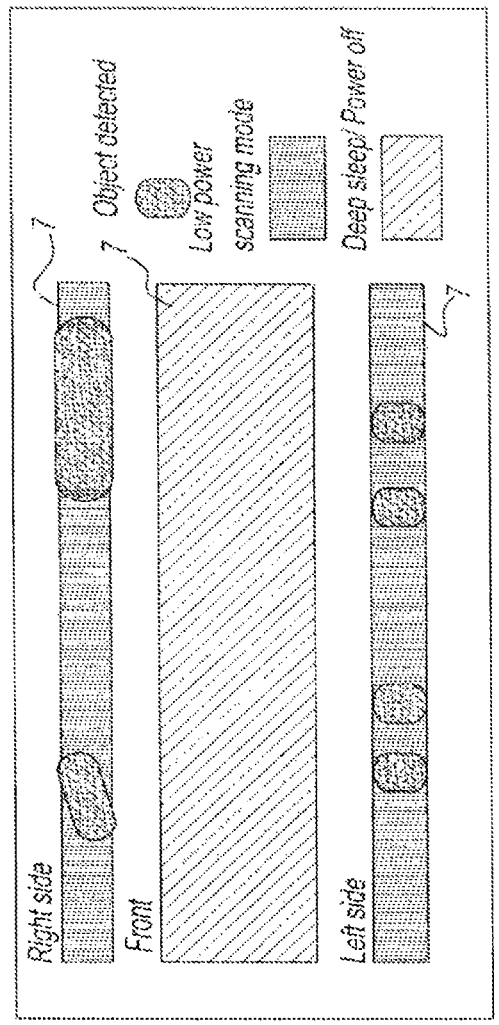
FIGS. 19A and 19B are explanatory diagrams illustrating an example where a mobile terminal device is held by one hand on the lateral sides and exemplary object detected area of side panels according to the fifth embodiment of the present disclosure.
Figure 19A:
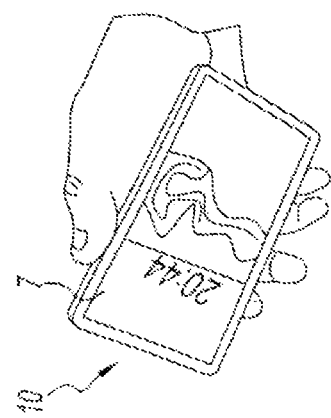

FIG. 19A is an explanatory diagram illustrating an example where a mobile terminal device is held by one hand on the lateral sides and exemplary object detected area of side panels according to the fifth embodiment of the present disclosure. FIG. 19B is a schematic diagram show position points where objects are detected. In this example, processing circuitry (such as a CPU, ASCI, PLA, ect.) may execute a specific operation (e.g. waking up the mobile terminal device) when a predetermined contact of an input operation on the side panels corresponding to the specific operation is detected by an input detector (e.g. predetermined multiple locations of side panels are touched simultaneously by holding the mobile terminal device by one hand). In this example, a front panel located on the front side of the mobile terminal device is set to be deep sleep mode or power off mode so that an input operation on the front panel is not detected. On the other hand, a right side panel located on the right side of the mobile terminal device and a left side panel located on the left side of the mobile terminal device are set to be low power scanning mode so that the right and left side panels can detect an input operation.

Figure 20:
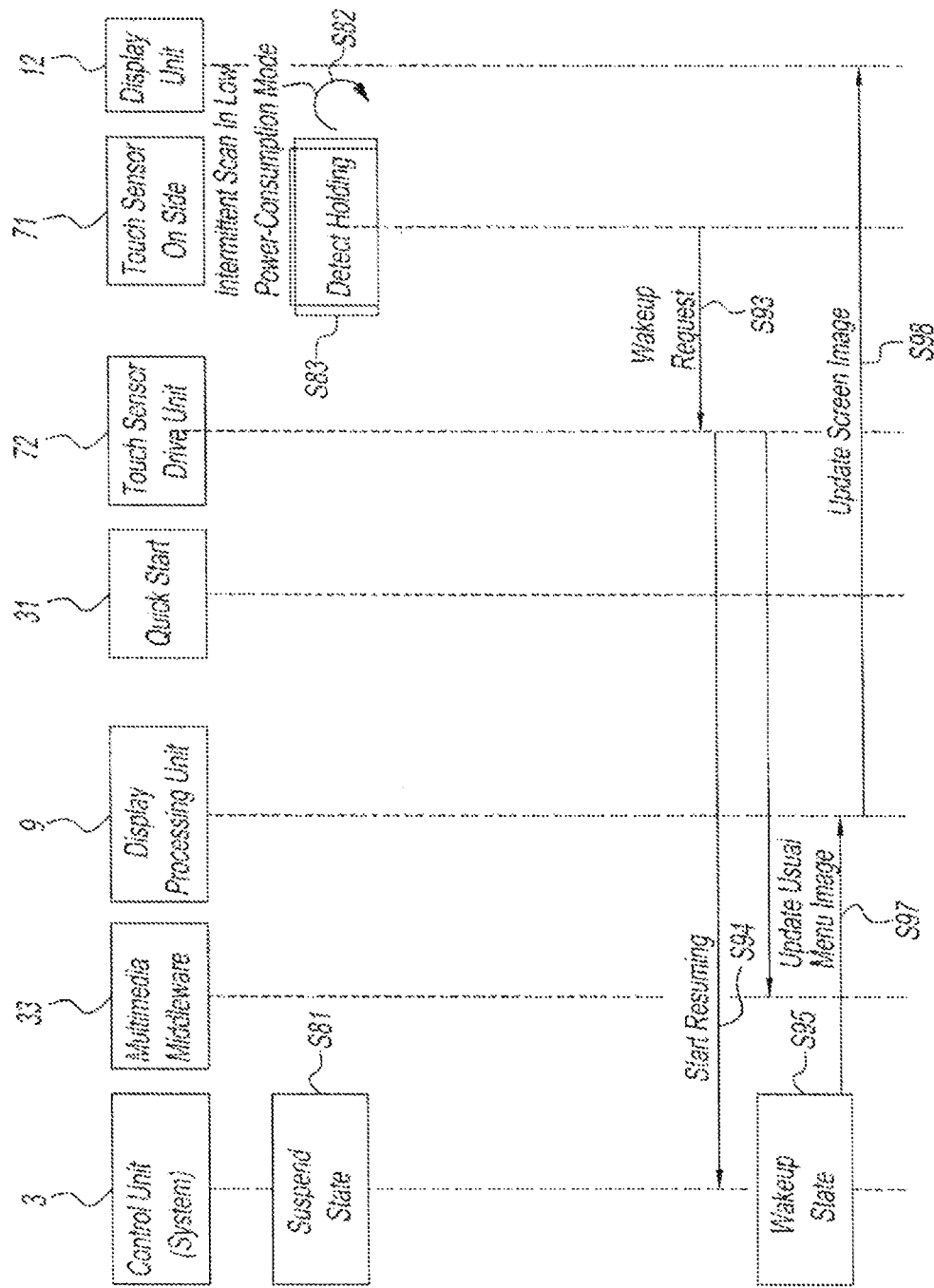
FIG. 20 is a sequence diagram illustrating an exemplary processing performed to wake up a mobile terminal device by detecting holding of the mobile terminal device by side panels according to the fifth embodiment of the present disclosure.

FIG. 20 is a sequence diagram illustrating an exemplary process flow performed to wake up a mobile terminal device by detecting holding of the mobile terminal device by side panels according to the fifth embodiment of the present disclosure. Other than the touch sensor being located on the right and left side of the mobile terminal device and holding of the mobile terminal device is detected by the right and left side panels, many of the steps perform a similar function to those described in FIG. 16.

Figure 21B:
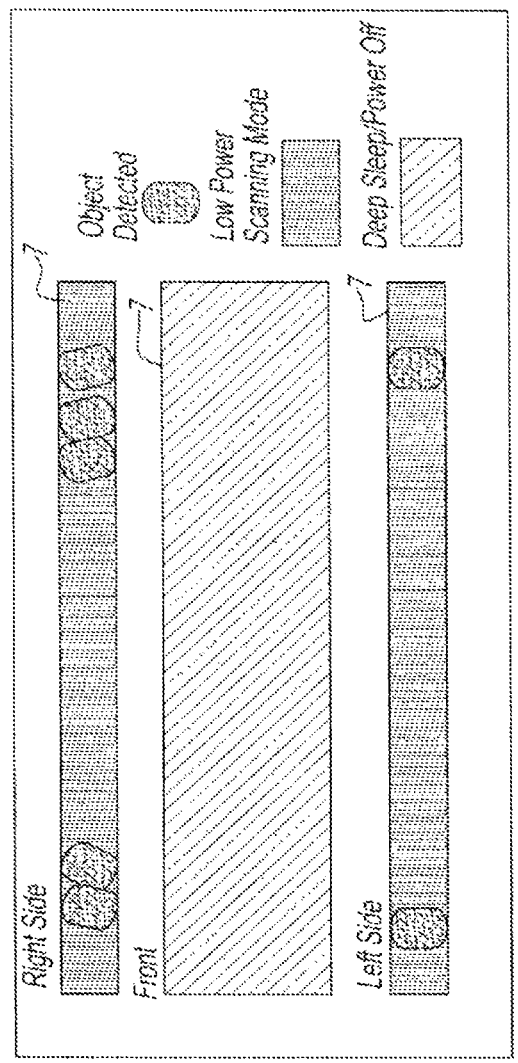
FIGS. 21A and 21B are explanatory diagrams illustrating an example where a mobile terminal device is held to capture (or shoot) an image by two hands on the lateral sides and exemplary object detected area of side panels according to the fifth embodiment of the present disclosure.
Figure 21A:
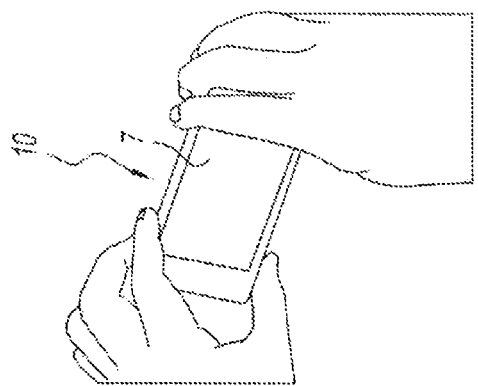

FIG. 21A is an explanatory diagram illustrating an example where a mobile terminal device is held to shoot by two hands on the lateral sides. FIG. 21B is a schematic diagram showing exemplary object detected areas of side panels according to the fifth embodiment of the present disclosure. In this example, processing circuitry may execute a specific operation (e.g. starting a camera application and capturing image) when a predetermined contact of an input operation on the side panels corresponding to the specific operation is detected by an input detector (e.g. predetermined multiple locations of the side panels are touched simultaneously by holding the mobile terminal device to shoot a photograph by two hands).

Figure 22:
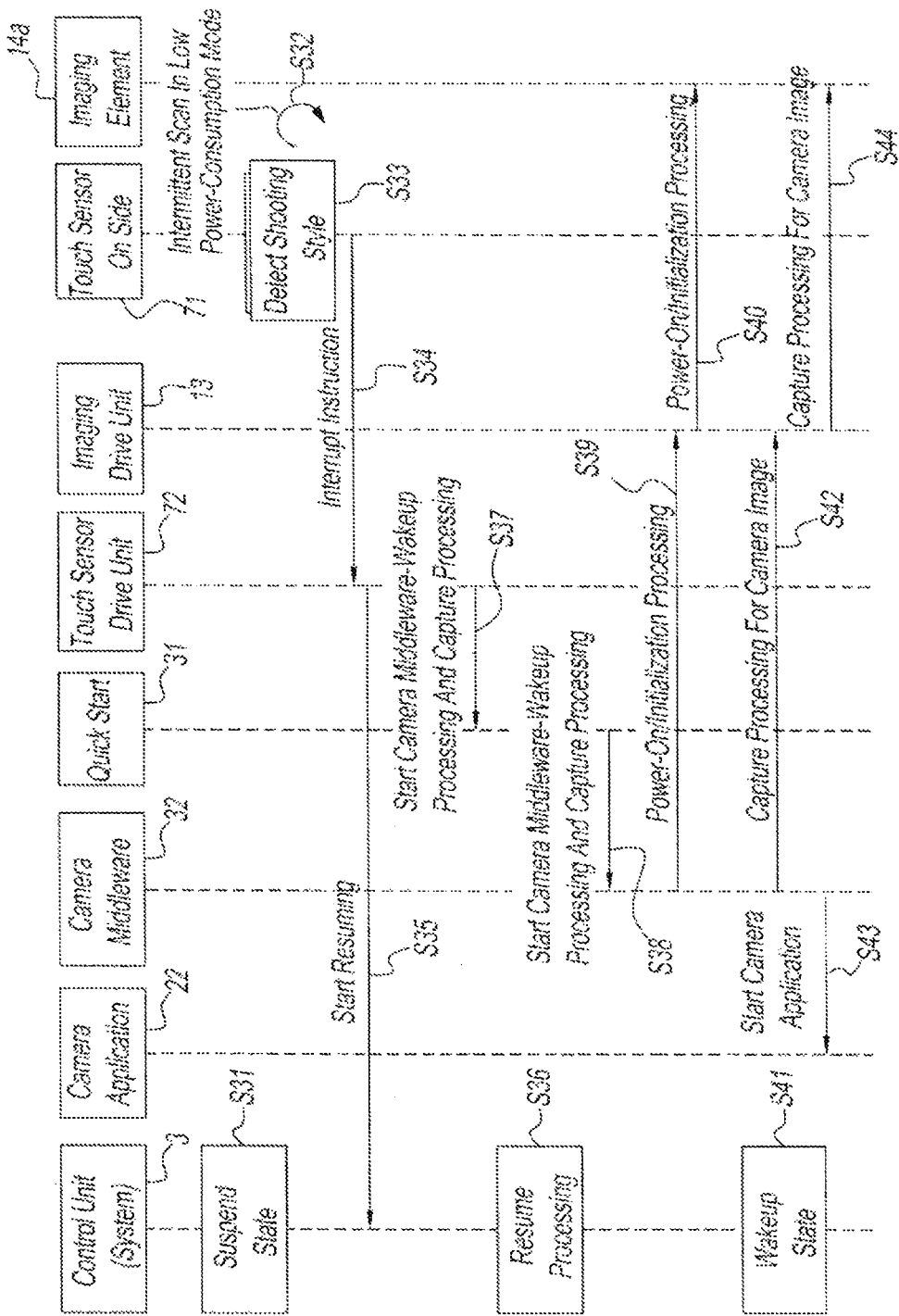
FIG. 22 is a sequence diagram illustrating an exemplary processing executed to start the camera application and perform shooting through an operation detected by side panels according to the fifth embodiment of the present disclosure.

FIG. 22 is a sequence diagram illustrating an exemplary process flow executed to start the camera application and perform shooting through an operation detected by side panels according to the fifth embodiment of the present disclosure. Other than the touch sensor is located on the right and left side of the mobile terminal device and holding of the mobile terminal device to shoot is detected by the right and left side panels, many of the steps perform a similar function to those described in FIG. 10.

FIG. 23A is an explanatory diagram illustrating an example where a mobile terminal device is held by one hand avoiding touching side panels and FIG. 23B is a schematic diagram showing exemplary object detected areas of side panels according to the fifth embodiment of the present disclosure. In this example, a mobile terminal device is held by touching only a front panel which is set to be deep sleep mode or power off mode, avoiding touching side panels which are set to be low power scanning mode. Therefore, no input operation is detected by the front panel and an unexpected operation of the mobile terminal device may be avoided.

FIG. 24A is an explanatory diagram illustrating an example where a mobile terminal device is held by one hand and FIG. 24B is a schematic diagram showing exemplary object detected areas of a front panel according to the fifth embodiment of the present disclosure. In this example, a processing circuitry may execute a specific operation (e.g. waking up the mobile terminal device) when a predetermined contact of an input operation on the front panel corresponding to the specific operation is detected by an input detector (e.g. predetermined multiple locations of the front panel are touched simultaneously by holding the mobile terminal device by one hand).

Figure 25:
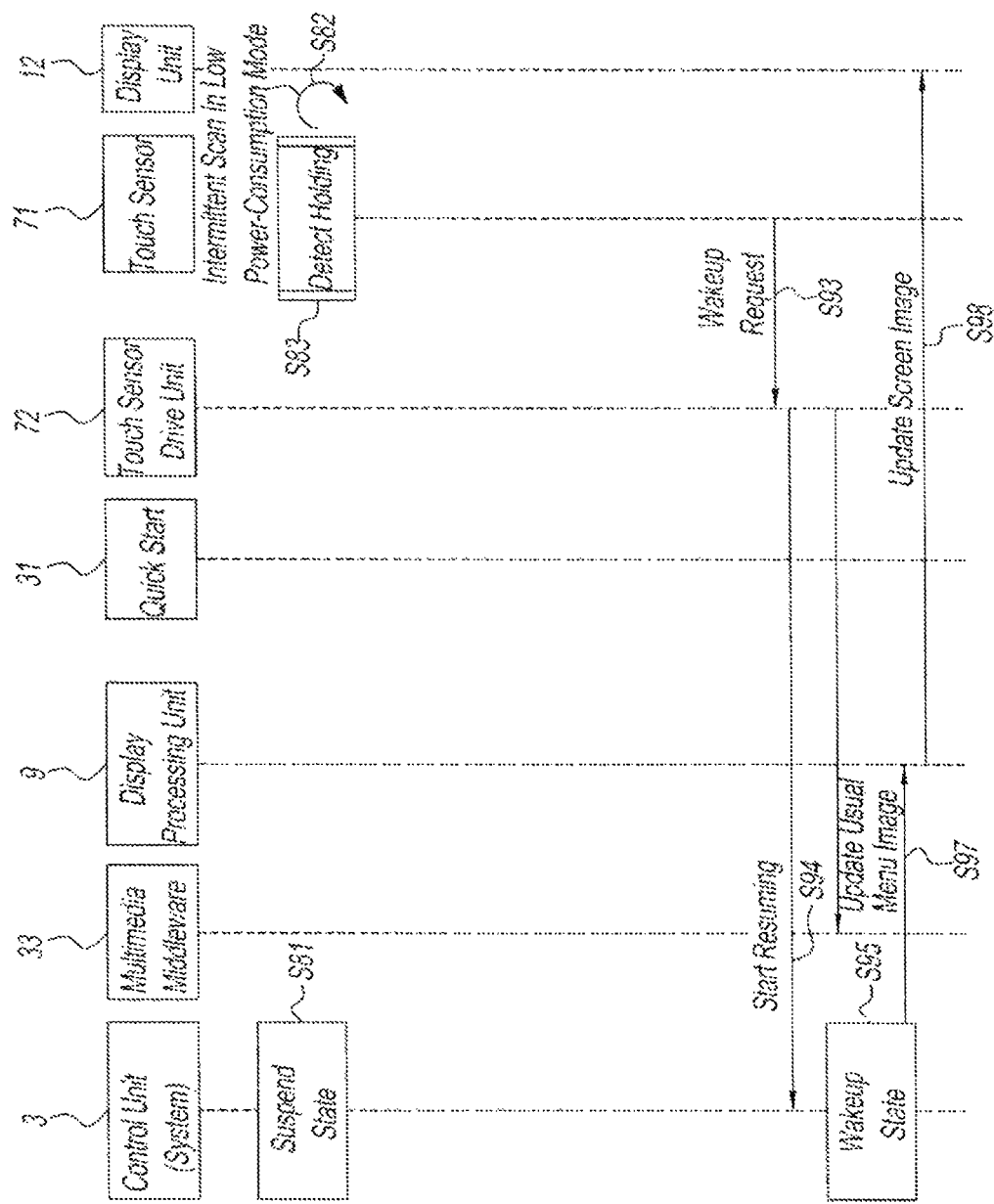
FIG. 25 is a sequence diagram illustrating an exemplary processing performed to wake up a mobile terminal device by detecting holding of the mobile terminal device by a front panel according to the fifth embodiment of the present disclosure.
Figure 26:
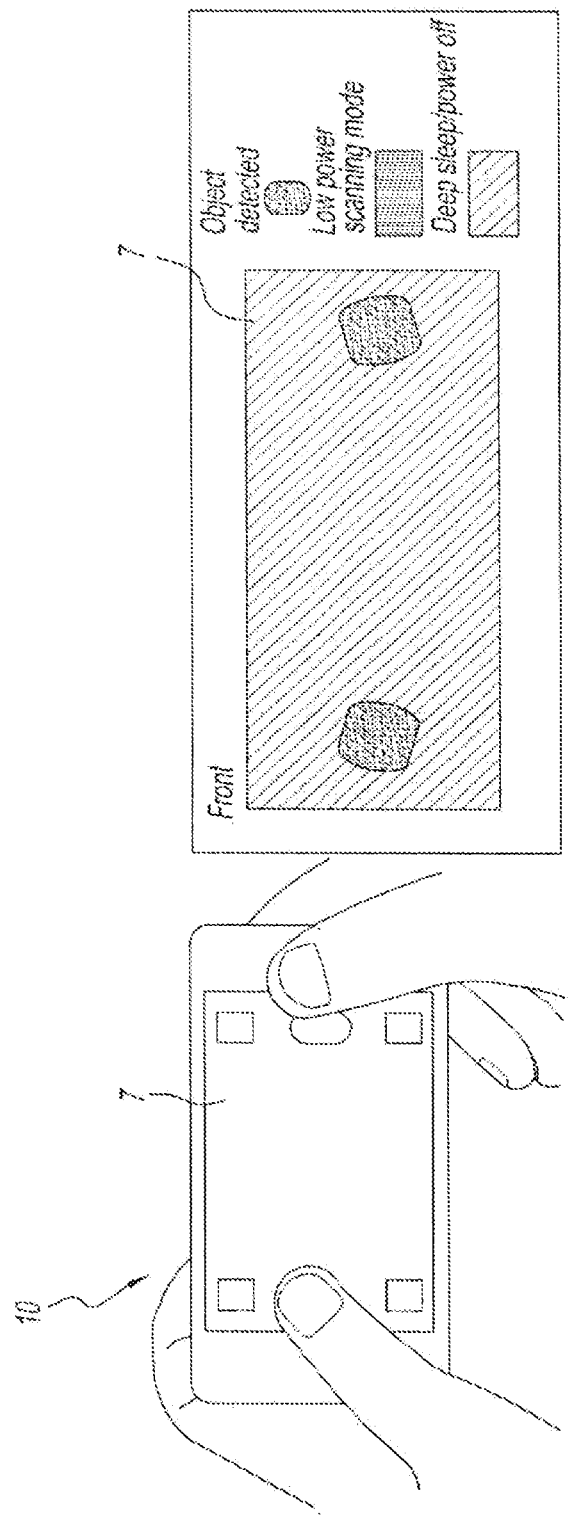
FIGS. 26A and 26B are explanatory diagrams illustrating an example where a mobile terminal device is held to shoot by two hands and exemplary object detected area of front panel according to the fifth embodiment of the present disclosure.

FIG. 25 is a sequence diagram illustrating an exemplary process flow performed to wake up a mobile terminal device by detecting holding of the mobile terminal device by a front panel according to the fifth embodiment of the present disclosure. Other than holding of the mobile terminal device is detected not by gesture, but by detecting simultaneous touch of predetermined multiple locations of the front panel, many of the steps perform a similar function to those described in FIG. 16.

FIG. 26A is an explanatory diagram illustrating an example where a mobile terminal device is held to shoot by two hands and FIG. 26B is a schematic diagram showing exemplary object detected areas of a front panel according to the fifth embodiment of the present disclosure. In this example, a processing circuitry may execute a specific operation (e.g. starting a camera application and capturing image) when a predetermined contact of an input operation on the front panel corresponding to the specific operation is detected by an input detector (e.g. predetermined multiple locations of the front panel are touched simultaneously by holding the mobile terminal device to shoot a photograph by two hands).

Figure 27:
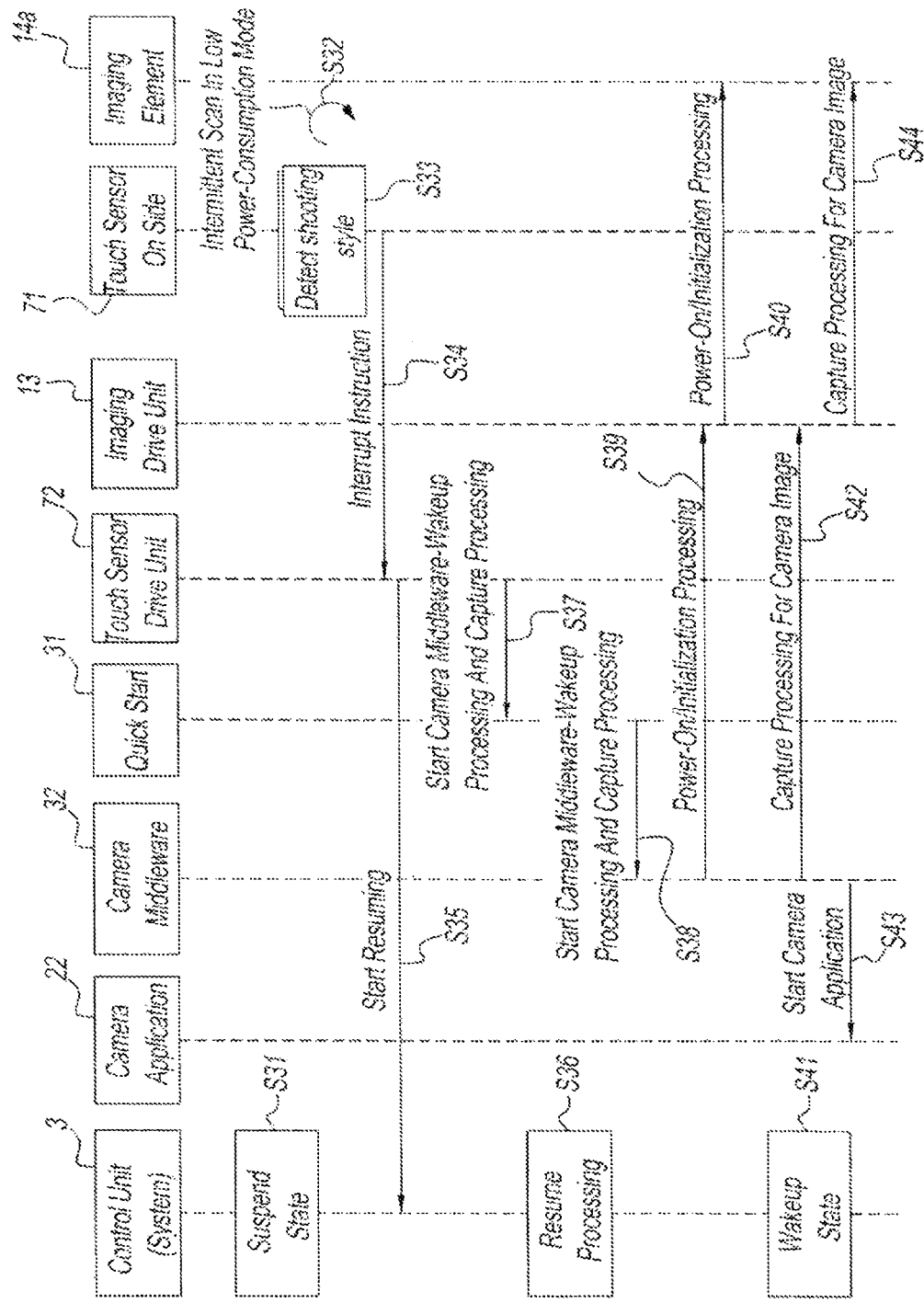
FIG. 27 is a sequence diagram illustrating an exemplary processing executed to start the camera application and perform shooting through an operation detected by a front panel according to the fifth embodiment of the present disclosure.

FIG. 27 is a sequence diagram illustrating an exemplary process flow executed to start the camera application and perform shooting through an operation detected by a front panel according to the fifth embodiment of the present disclosure. Other than holding of the mobile terminal device is detected not by gesture, but by detecting simultaneous touch of predetermined multiple locations of the front panel to shoot, many of the steps perform a similar function to those described in FIG. 10.

Figure 28B:
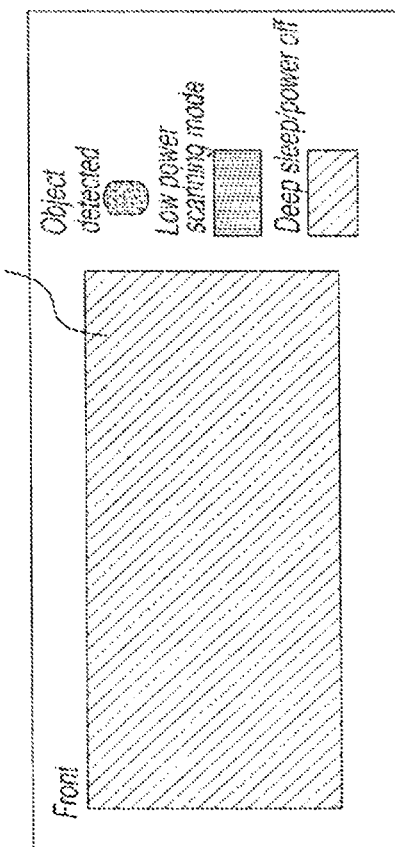
FIGS. 28A and 28B are explanatory diagrams illustrating an example where a mobile terminal device is held by one hand avoiding touching a front panel and exemplary object detected area of a front panel according to the fifth embodiment of the present disclosure.
Figure 28A:
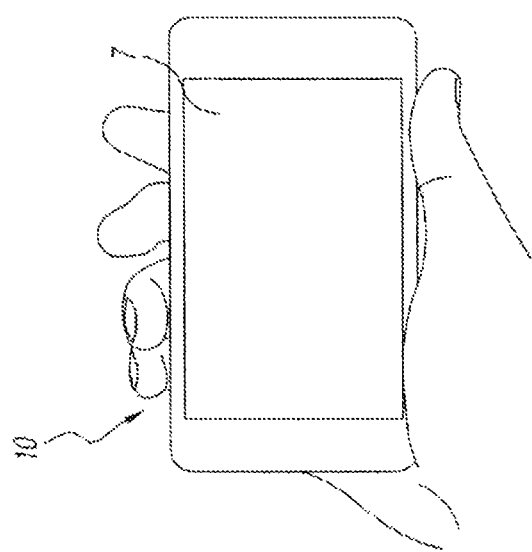

FIG. 28A is an explanatory diagram illustrating an example where a mobile terminal device is held by one hand avoiding touching a front panel and FIG. 28B is a schematic diagram showing exemplary object detected areas of a front panel according to the fifth embodiment of the present disclosure. In this example, as a mobile terminal device is held by avoiding touching a front panel which is set to be a low power scanning mode, no input operation is detected by the front panel and an unexpected operation of the mobile terminal device may be avoided.

In each of the described embodiments, a user may change a predetermined contact of an input operation from a touch panel. For example, a user may change a predetermined gesture or predetermined multiple locations to be touched simultaneously to start a camera application to a new contact by changing a setting from the touch panel. Based on the change of the setting by the user, processing circuitry changes the predetermined contact of the input operation required to execute a specific operation to the new predetermined contact.

Incidentally, the above-described functions according to the first to fourth embodiments may be used separately or arbitrarily combined with one another. Further, the type of a gesture operation is not limited to the above-described embodiments so that a combination of the pinch operation and the tap operation may be provided. Thus, the combination of a gesture operation, a function, and so forth may be appropriately changed based on specifications of the mobile terminal device 10.

Further, a series of processings according to the above-described embodiments is often executed by software. In that case, the execution is enabled by a computer having specifically designed hardware where a program constituting the software is installed, or a computer where a program achieved to execute various functions is installed. For example, a program constituting desired software may be installed in a general-purpose computer, etc. for the execution.

Further, a storage medium storing program code of software for implementing the functions of the above-described embodiments may be supplied to a system or an apparatus. Further, it is needless to say that a computer (or a control device such as a CPU) of the system or the apparatus may read and execute the program code stored in the storage medium so that the functions are implemented.

The storage medium provided for supplying the program code may include, for example, a flexible disk, a hard disk, an optical disk, a magneto-optical disk, a CD-ROM, a CD-R, a magnetic tape, a non-volatile memory card, a ROM, etc.

Further, the functions of the above-described embodiments are implemented by the computer reading and executing the program code. Additionally, an OS or the like running on the computer executes part of or the entire actual processing based on instructions from the program code. The functions of the above-described embodiments may be implemented by the processing, which constitutes another embodiment. Further, the processings according to the present embodiments may be constituted by hardware instead of being executed by software as stated above.

Further, it is taken for granted that the present disclosure is not limited to the above-described embodiments, but may be applied and modified in different and various ways without leaving the spirit of the present disclosure, which is written in the claims. To this end, it should be understood by those skilled in the art that various modifications, combinations, and other exemplary embodiments may occur depending on design and/or other factors insofar as they are within the scope of the claims or the equivalents thereof, as a matter of course.

Incidentally, the present disclosure may be configured as below.

(1)

A mobile terminal device including:

a touch panel where a specified input operation is performed with an indicator, an input detection unit configured to detect a pattern of the input operation based on a position of the indicator on the touch panel, and decrease a frequency of execution of processing arranged to detect the input operation performed on the touch panel when the input operation performed on the touch panel is not detected over a specified time period, and an operation determination unit configured to instruct a controlled unit determined to be an operation target based on the pattern of the input operation to execute a specified operation when the pattern of the input operation is detected in the case where the execution frequency of the processing arranged to detect the input operation is low.

(2)

The mobile terminal device according to said (1), including:

a display unit configured to display an image, as the controlled unit, wherein when the input detection unit detects that the specified input operation is performed on the touch panel in a suspend state, the operation determination unit causes the display unit to display a specified screen image.

(3)

The mobile terminal device according to said (1) or (2), including:

an imaging unit having an optical system that shoots a subject, and an imaging drive unit configured to control an operation of the imaging unit, wherein when the input detection unit detects that an input operation different from the specified input operation is performed on the touch panel in the suspend state, the operation determination unit starts the operation of the imaging unit through the imaging drive unit, and causes the display unit to display an image obtained by imaging performed with the imaging unit.

(4)

The mobile terminal device according to any one of said (1) to (3), including:

a sound emitting unit configured to emit a voice, as the controlled unit, and a voice processing unit configured to perform voice processing for voice data and cause the sound emitting unit to emit a voice, wherein when the input detection unit detects that a specified input operation is performed on the touch panel in the suspend state, the operation determination unit causes the voice processing to start performing voice processing and causes the sound emitting unit to emit a voice.

(5)

The mobile terminal device according to any one of said (1) to (4), further including:

a sensor unit configured to output a specified sensor value, wherein when the input detection unit detects that a specified input operation is performed on the touch panel in the suspend state, the operation determination unit selects a single the controlled unit from among plural types of the controlled units based on the sensor value, and causes the selected controlled unit to execute a specified operation.

(6)

The mobile terminal device according to any one of said (1) to (5), wherein when the input detection unit detects that different input operations are performed on the touch panel plural times in a predetermined order in the suspend state, the operation determination unit causes the controlled unit associated with a different input operation to execute a specified operation.

(7)

The mobile terminal device according to any one of said (1) to (6), wherein when the input detection unit detects that the specified input operation is similar to a stipulated input operation, the operation determination unit causes the display unit to display a guide representing the stipulated input operation, and instructs the controlled unit associated with the stipulated input operation to execute a specified operation when the input detection unit detects that an input operation performed on the touch panel again in accordance with the guide is the stipulated input operation.

(8)

The mobile terminal device according to any one of said (1) to (7), wherein when the pattern of the input operation is detected in the suspend state, the operation determination unit starts middleware, and causes a specified operation to be executed from the middleware for the controlled unit determined to be an operation target in relation to the pattern of the input operation.

(9)

The mobile terminal device according to any one of said (1) to (8), wherein the suspend state is a state where at least application software and the middleware are not started, and wherein, in the controlled unit, an operation is controlled via the application software and the middleware when the input operation performed on the touch panel is achieved in a state where the application software is started, and an operation is controlled via the middleware in the suspend state.

(10)

An operation method including:

a step of detecting a pattern of an input operation based on a position of an indicator by which an input operation is performed on a touch panel, a step of detecting the pattern of the input operation based on the position of the indicator on the touch panel, and decreasing a frequency of execution of processing arranged to detect the input operation performed on the touch panel when the input operation performed on the touch panel is not detected over a specified time period, and a step of instructing a controlled unit determined to be an operation target based on the pattern of the input operation to execute a specified operation when the pattern of the input operation is detected in the case where the execution frequency of the processing arranged to detect the input operation is low.

(11)

A program causing a computer to execute:

a procedure for detecting a pattern of an input operation based on a position of an indicator by which an input operation is performed on a touch panel, a procedure for detecting the pattern of the input operation based on the position of the indicator on the touch panel, and decreasing a frequency of execution of processing arranged to detect the input operation performed on the touch panel when the input operation performed on the touch panel is not detected over a specified time period, and a procedure for instructing a controlled unit determined to be an operation target based on the pattern of the input operation to execute a specified operation when the pattern of the input operation is detected in the case where the execution frequency of the processing arranged to detect the input operation is low.

(12)

A computer-readable storage medium storing a program causing a computer to execute:

a procedure for detecting a pattern of an input operation based on a position of an indicator by which an input operation is performed on a touch panel, a procedure for detecting the pattern of the input operation based on the position of the indicator on the touch panel, and decreasing a frequency of execution of processing arranged to detect the input operation performed on the touch panel when the input operation performed on the touch panel is not detected over a specified time period, and a procedure for instructing a controlled unit determined to be an operation target based on the pattern of the input operation to execute a specified operation when the pattern of the input operation is detected in the case where the execution frequency of the processing arranged to detect the input operation is low.

REFERENCE SIGNS LIST

7: touch panel, 10: mobile terminal device, 39: display panel, 71: touch sensor, 72: touch sensor drive unit, 73: display unit

The invention claimed is:

1. A method for controlling a mobile terminal device, the method comprising:
   detecting an input operation associated with a touch panel;
   detecting a predetermined contact of the input operation associated with the touch panel;
   shifting the mobile terminal device to a suspend state when an input operation is not detected over a specified time period; and
   executing a specific operation when the predetermined contact of the input operation associated with the touch panel corresponding to the specific operation is detected when the mobile terminal device is in the suspend state.

2. The method for controlling a mobile terminal according to claim 1, wherein each of the predetermined contact differs depending on the corresponding specific operation.

3. The method for controlling a mobile terminal according to claim 1,
   wherein the touch panel includes a plurality of panels, and
   wherein the method further comprises:
   decreasing a frequency of detection by one or more of the panels to a certain level; and
   decreasing the frequency of detection by the other panels to another level lower than the certain level when said detecting the input operations does not detect the input operation by certain one or more of the panels over the specified time period.

4. The method for controlling a mobile terminal according to claim 1, wherein the specific operation is displaying a home screen, starting a camera application, or reproducing music.

5. The method for controlling a mobile terminal according to claim 1, wherein the predetermined contact includes sequential contacts of predetermined locations and/or simultaneous contacts of predetermined multiple locations.

6. A non-transitory computer readable medium including executable instructions, which cause processing circuitry to execute a method for controlling a mobile terminal device, comprising:
   detecting an input operation associated with a touch panel;
   detecting a predetermined contact of the input operation associated with the touch panel;
   shifting the mobile terminal device to a suspend state when an input operation is not detected over a specified time period; and
   executing a specific operation when the predetermined contact of the input operation on the touch panel corresponding to the specific operation is detected when the mobile terminal device is in the suspend state.

7. The non-transitory computer readable medium according to 6, wherein each of the predetermined contact differs depending on the corresponding specific operation.

8. The non-transitory computer readable medium according to claim 6,
   wherein the touch panel includes a plurality of panels, and
   wherein the method further comprises:
   decreasing a frequency of detection by one or more of the panels to a certain level; and
   decreasing the frequency of detection by the other panels to another level lower than the certain level when said detecting the input operations does not detect the input operation by certain one or more of the panels over the specified time period.

9. The non-transitory computer readable medium according to claim 6, wherein the specific operation is displaying a home screen, starting a camera application, or reproducing music.

10. The non-transitory computer readable medium according to claim 6, wherein the predetermined contact includes sequential contacts of predetermined locations and/or simultaneous contacts of predetermined multiple locations.

11. A mobile terminal device comprising:
    a touch panel that detects an input operation; and
    processing circuitry that
    detects a predetermined contact of the input operation on the touch panel;
    controls the mobile terminal device to shift to a suspend state when an input operation is not detected by the touch panel over a specified time period; and
    executes a specific operation when the predetermined contact of the input operation on the touch panel corresponding to the specific operation is detected when the mobile terminal device is in the suspend state.

12. The mobile terminal device according to claim 11, wherein the predetermined contact includes sequential contacts of predetermined locations, the sequential contacts including continuous contact of the predetermined locations.

13. The mobile terminal device according to claim 11, wherein each of the predetermined contact differs depending on the corresponding specific operation.

14. The mobile terminal device according to claim 11, wherein the processing circuitry displays a home screen, starts a camera application, or reproduces music when the predetermined contact of the input operation on the touch panel corresponding to the specific operation is detected when the mobile terminal device is in the suspend state.

15. The mobile terminal device according to claim 11, further comprising:
a sensor unit that outputs a sensor value,
wherein the processing circuitry determines which of a specific operation to execute from a plurality of specific operations based on the sensor value, when the predetermined contact of the input operation on the touch panel is detected when the mobile terminal device is in the suspend state.

16. The mobile terminal device according to claim 15, wherein the sensor unit includes an acceleration sensor, and the processing circuitry executes the determined specific operation according to the sensor value.

17. The mobile terminal device according to claim 11, wherein the processing circuitry executes the specific operation when a predetermined combination of plurality of predetermined contacts of the input operation on the touch panel corresponding to the specific operation is detected when the mobile terminal device is in the suspend state.

18. The mobile terminal device according to claim 11, further comprising:
a display,
wherein the processing circuitry judges whether the input operation detected by the touch panel is similar to the predetermined contact and controls the display to display a guide representing the predetermined contact when the processing circuitry judges the input operation is similar to the predetermined contact.

19. The mobile terminal device according to claim 11, wherein the processing circuitry controls a sleep period where at least one of the functions of the mobile terminal device is stopped between detection periods of the touch panel when the mobile terminal device is in the suspend state.

20. The mobile terminal device according to claim 11, wherein the touch panel includes a plurality of panels, and
wherein the processing circuitry decreases a frequency of detection by one or more of the panels to a certain level and to decrease the frequency of detection by the other panels to another level lower than the certain level when the input operation is not detected by certain one or more of the panels over the specified time period.

21. The mobile terminal device according to claim 20, wherein one of the panels is a front panel located on a front side of the mobile terminal device and two of the other panels are side panels located on one or more lateral sides of the mobile terminal device.

22. The mobile terminal device according to claim 21, wherein the processing circuitry decreases the frequency of detection by the front panel to be a deep sleep mode or a power off mode which is lower than the frequency of detection by the side panels.

23. The mobile terminal device according to claim 11, wherein the processing circuitry changes the predetermined contact of the input operation to another predetermined contact of the input operation based on the input from the touch panel.

24. The mobile terminal device according to claim 11, wherein the predetermined contact includes sequential contacts of predetermined locations and/or simultaneous contacts of predetermined multiple locations.

* * * * *